(12) United States Patent
Kitano et al.

(10) Patent No.: US 11,469,638 B2
(45) Date of Patent: Oct. 11, 2022

(54) STATOR INSULATING MEMBERS FOR ROTARY ELECTRIC MACHINE

(71) Applicant: Mitsubishi Electric Corporation, Tokyo (JP)

(72) Inventors: Shuichi Kitano, Tokyo (JP); Masahiro Nigo, Tokyo (JP); Kazuya Kumagai, Tokyo (JP); Ryo Ishida, Tokyo (JP); Hironori Tsuiki, Tokyo (JP); Moriyuki Hazeyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 152 days.

(21) Appl. No.: 16/968,743

(22) PCT Filed: Mar. 15, 2019

(86) PCT No.: PCT/JP2019/010783
§ 371 (c)(1),
(2) Date: Aug. 10, 2020

(87) PCT Pub. No.: WO2019/181770
PCT Pub. Date: Sep. 26, 2019

(65) Prior Publication Data
US 2021/0050757 A1 Feb. 18, 2021

(30) Foreign Application Priority Data
Mar. 22, 2018 (JP) .............................. JP2018-053742

(51) Int. Cl.
*H02K 3/34* (2006.01)
*H02K 3/32* (2006.01)
*H02K 1/14* (2006.01)

(52) U.S. Cl.
CPC ............. *H02K 3/325* (2013.01); *H02K 1/146* (2013.01)

(58) Field of Classification Search
CPC ........ H02K 3/325; H02K 3/345; H02K 1/146; H02K 1/148
(Continued)

(56) References Cited

U.S. PATENT DOCUMENTS

2012/0286619 A1* 11/2012 Tsuiki .................... H02K 3/522
310/215
2012/0313477 A1* 12/2012 Haga ........................ H02K 1/27
310/215
(Continued)

FOREIGN PATENT DOCUMENTS

JP 2015076953 A 4/2015
JP 2016036223 A * 3/2016
(Continued)

OTHER PUBLICATIONS

Machine translation of JP-2017103850-A. (Year: 2017).*
(Continued)

*Primary Examiner* — Michael Andrews
(74) *Attorney, Agent, or Firm* — Buchanan Ingersoll & Rooney PC

(57) ABSTRACT

Two types of insulating members, i.e., end surface insulators and slot insulators are provided. On tooth portion sides of both side surfaces in the circumferential direction of tooth end surface covering portions of the end surface insulator, first cutouts recessed in the circumferential direction are provided so as to extend in the radial direction. A part axially upward of the first cutouts protrudes in the circumferential direction to form a first overhang portion, and the slot insulator is accommodated between the first overhang portions of two end surface insulators.

11 Claims, 20 Drawing Sheets

(58) Field of Classification Search
USPC .......................................................... 310/215
See application file for complete search history.

(56) References Cited

U.S. PATENT DOCUMENTS

2014/0327336 A1* 11/2014 Ewert .................... H02K 3/345
310/215
2019/0074735 A1*  3/2019 Shono .................... H02K 1/146

FOREIGN PATENT DOCUMENTS

| JP | 2016036223 A |   | 3/2016 |            |
|----|--------------|---|--------|------------|
| JP | 2016077129 A |   | 5/2016 |            |
| JP | 2016140242 A |   | 8/2016 |            |
| JP | 2017103850 A | * | 6/2017 | H02K 3/345 |
| JP | 2017103850 A |   | 6/2017 |            |

OTHER PUBLICATIONS

Machine translation of JP-2016036223-A. (Year: 2016).*
International Search Report (PCT/ISA/210), with translation, and Written Opinion (PCT/ISA/237) dated Jun. 11, 2019, by the Japan Patent Office as the International Searching Authority for International Application No. PCT/JP2019/010783.
First Examination Report dated Jun. 28, 2021, issued in corresponding Indian Patent Application No. 202047035327, 5 pages.

* cited by examiner

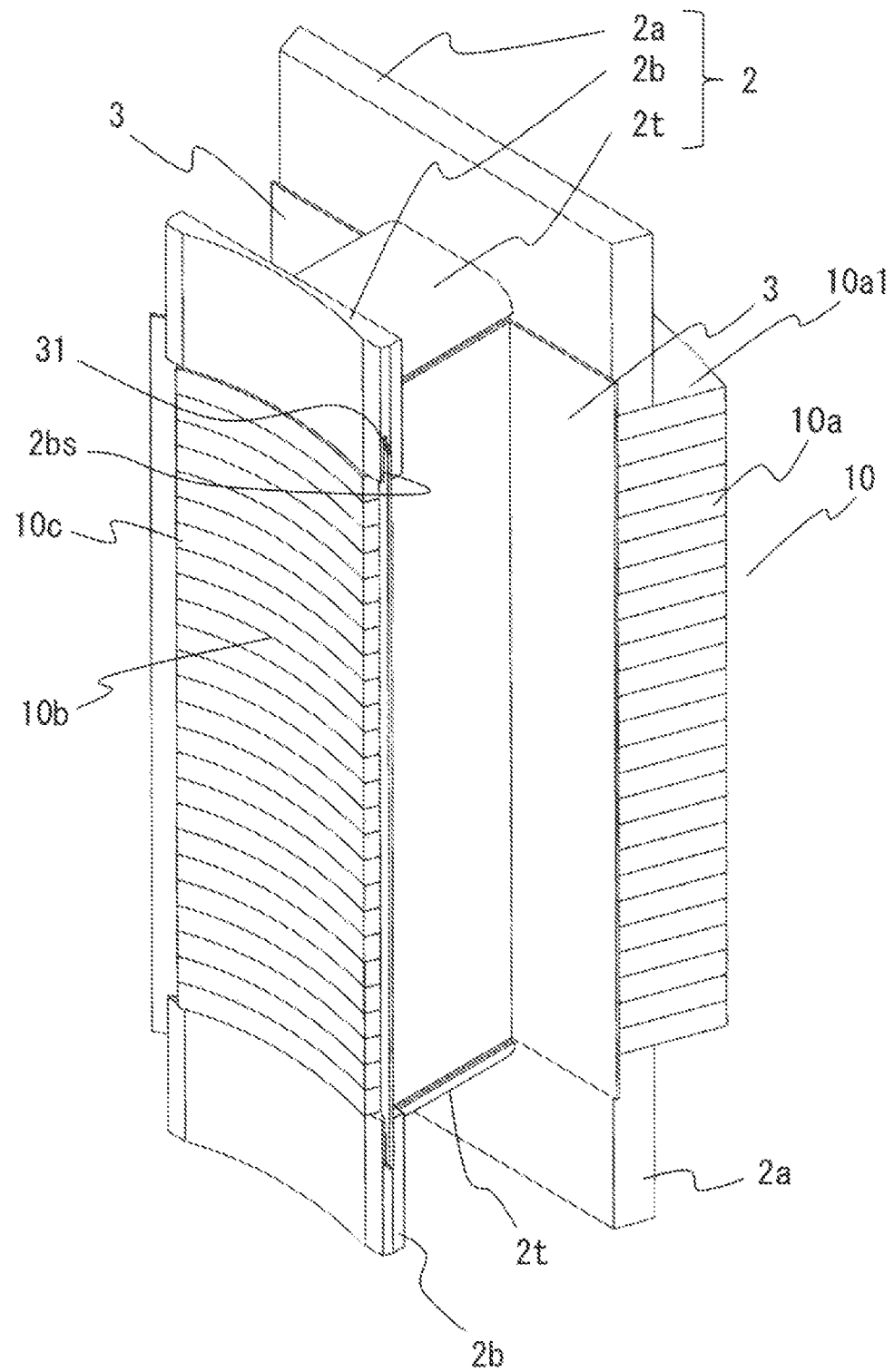

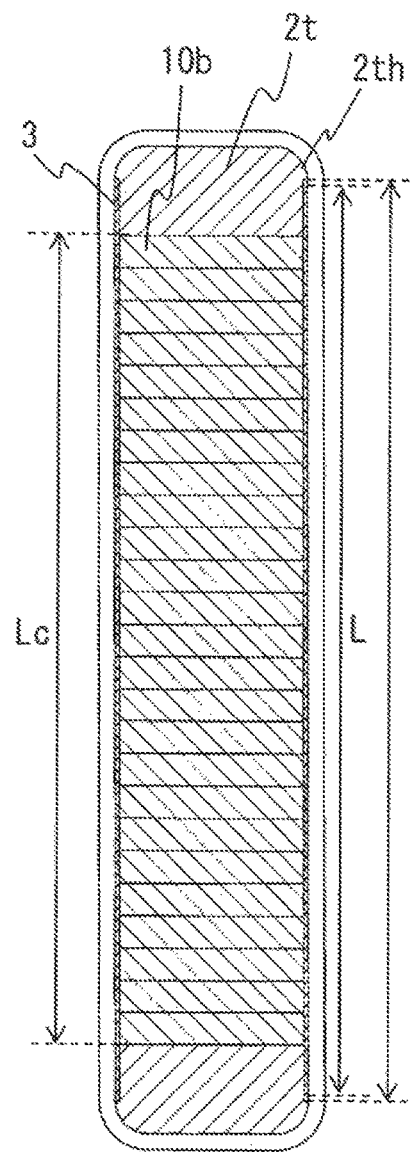
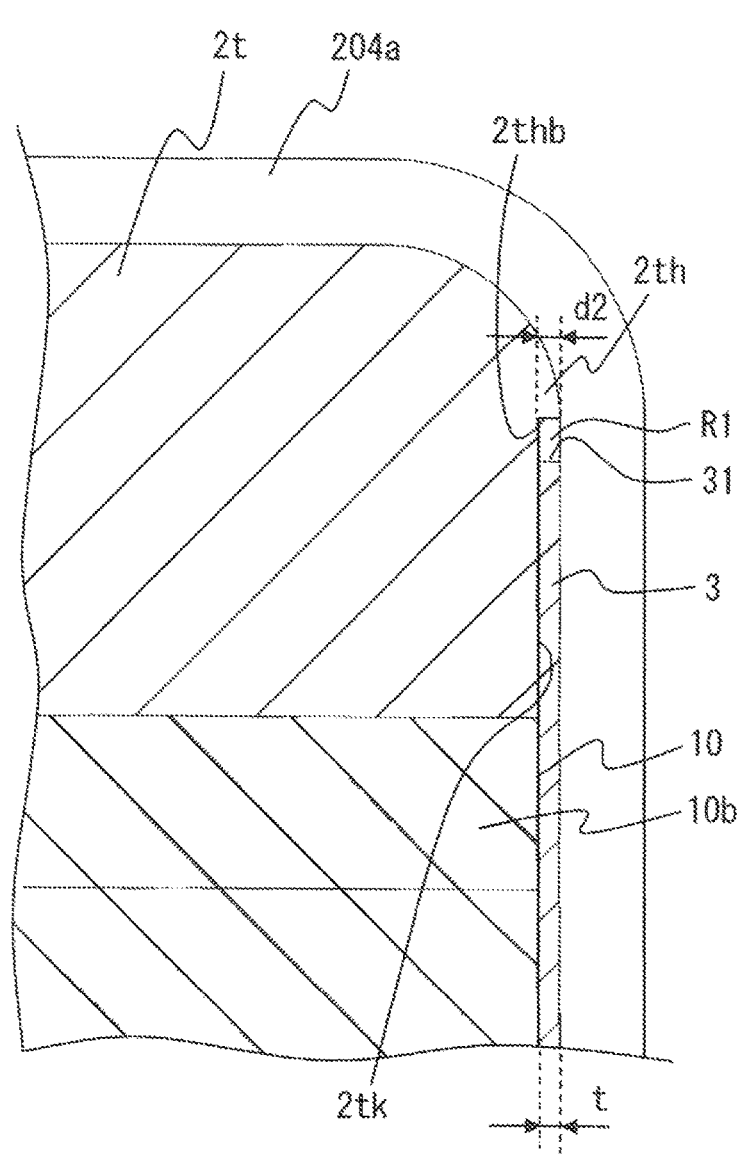
FIG. 12A
FIG. 12B

STATOR INSULATING MEMBERS FOR ROTARY ELECTRIC MACHINE

TECHNICAL FIELD

The present disclosure relates to a stator for a rotary electric machine for use in an electric apparatus.

BACKGROUND ART

When a rotary electric machine is driven, a stray capacitance occurs between a stator core and a coil of the rotary electric machine. Leakage current due to the stray capacitance becomes a problem. For example, in a hermetic compressor, a stator is directly fixed to a hermetic container made of a steel plate. Therefore, in order not to affect a human body, it is required that leakage current flowing between a charger and the container body surface should be 1 mA or smaller according to Electrical Appliance and Material Control Law. Therefore, it is necessary to take measures for making the leakage current equal to or smaller than the above prescribed value.

From the principle of occurrence of leakage current, a relationship of the following Expression (1) is satisfied among leakage current i, a frequency f, a stray capacitance C, and voltage V.

$$i = 2\pi f C V \qquad (1)$$

In addition, a relationship of the following Expression (2) is satisfied among the stray capacitance C between the coil and the stator core, relative permittivity ε between the coil and the stator core, an area S between the coil and the stator core, and a distance d between the coil and the stator core.

$$C = \varepsilon S/d \qquad (2)$$

According to the above relationships of Expression (1) and Expression (2), leakage current due to the stray capacitance can be easily reduced by increasing the distance d between the coil and the stator core. However, if the distance d between the coil and the stator core increases, the area in which windings can be made is reduced, so that the space factor of the coil decreases, resulting in reduction of product performance.

For example, Patent Document 1 proposes a stator of a rotary electric machine having the following feature. That is, the rotary electric machine includes a stator including a stator core, insulators provided at both ends in the bearing direction of the stator core, a coil wound in a concentrated manner around the stator core and the insulators, and an insulating material provided between the stator core and the coil. The stator core has a stator core annular portion and a plurality of tooth portions protruding inward in the radial direction from the inner circumferential surface of the stator core annular portion. The insulator has an insulator annular portion and a plurality of trunk portions protruding inward in the radial direction from the inner circumferential surface of the insulator annular portion. The width in the circumferential direction of the trunk portion is greater than the width in the circumferential direction of the tooth portion. The coil and the insulating material are in contact with each other. The distance between the coil and the stator core is greater than the thickness of the insulating material, and the permittivity of the insulating material is smaller than the permittivity in the gap between the coil and the stator core.

In addition, Patent Document 2 proposes a stator of a rotary electric machine, which includes an insulating material formed by stacking a plurality of insulating thin sheets, wherein, of the plurality of insulating materials, the insulating thin sheet on one side has folded portions at both ends in the axial direction, and the axial-direction ends of the insulating thin sheet on the other side of the plurality of insulating thin sheets are inserted into the folded portions.

CITATION LIST

Patent Document

Patent Document 1: Japanese Laid-Open Patent Publication No. 2016-140242
Patent Document 2: Japanese Laid-Open Patent Publication No. 2015-076953

SUMMARY OF THE INVENTION

Problems to be Solved by the Invention

However, the rotary electric machine described in Patent Document 1 has a structure in which the coil is in contact with an end of the insulating material in the axial direction of a rotary shaft of the rotary electric machine. Therefore, the end of the insulating material is deformed by being subjected to tension of a winding and the position of the coil moves to the tooth side in the circumferential direction of the rotary electric machine, so that the distance between the coil and the stator core is shortened, thus causing a problem that leakage current cannot be reduced.

In addition, the trunk portion of the insulator protrudes to be greater than the width in the circumferential direction of the tooth portion of the stator core so that a gap is formed between the coil and the stator core, thereby ensuring the distance between the coil and the stator core. At this time, the coil is pressed, due to its own tension, to a corner portion of the trunk portion of the insulator, whereby an insulation coat covering the outer circumference of a winding conductor forming the coil is deteriorated, thus causing a problem that the product quality is impaired.

In the rotary electric machine described in Patent Document 2, the insulating material is formed by stacking a plurality of insulating thin sheets, and the coil is in contact with an end of the insulating material in the axial direction of a rotary shaft of the rotary electric machine. Therefore, the insulating material formed by stacking the plurality of insulating thin sheets are deformed by being subjected to tension of a winding. Thus, as in Patent Document 1, the position of the coil moves to the tooth side in the circumferential direction of the rotary electric machine, so that the insulation distance between the coil and the stator core is shortened and the stray capacitance increases. Thus, leakage current cannot be reduced.

The present disclosure has been made to solve the above problems, and an object of the present disclosure is to provide a stator for a rotary electric machine in which, while a distance is ensured between a coil and a stator core using a thin insulating material, the insulation distance between the coil and the stator core is ensured without damaging an insulation coat, and thus leakage current occurring between the coil and the stator core can be reduced.

Solution to the Problems

A stator for a rotary electric machine according to the present disclosure includes: a core formed by annularly combining a plurality of cores each of which is formed by stacking a plurality of core pieces in an axial direction and has a yoke portion, a tooth portion protruding inward from an inner circumferential surface of the yoke portion, and shoe portions protruding toward both sides in a circumferential direction from an inner end of the tooth portion; and a coil wound around the core with insulating members therebetween.

The insulating members include the following two types: end surface insulators mounted to both end surfaces in the axial direction of the core, each end surface insulator including an outer flange standing upward in the axial direction and covering a part radially outward from an inner-circumferential-side edge of an axial end surface of the yoke portion so as to be in close contact therewith, an inner flange standing upward in the axial direction and covering axial end surfaces of the shoe portions and a part radially outward from an inner-circumferential-side edge of the tooth portion so as to be in close contact therewith, and a tooth end surface covering portion which covers an axial end surface of the tooth portion so as to be in contact with the axial end surface and which has an outer-circumferential-side end connected to the outer flange and an inner-circumferential-side end connected to the inner flange via a slope portion which expands radially inward in a taper shape, and a slot insulator seamlessly covering an inner side surface of the yoke portion, a circumferential-direction side surface of the tooth portion, and an outer side surface of the shoe portion.

On tooth portion sides of both side surfaces in the circumferential direction of the tooth end surface covering portion, first cutouts recessed in the circumferential direction are provided so as to extend in a radial direction, and a part axially upward of the first cutouts protrudes in the circumferential direction to form a first overhang portion.

The slot insulator is accommodated between the first overhang portions of the two end surface insulators.

Effect of the Invention

In the stator for a rotary electric machine according to the present disclosure, plural turns of the winding conductor in the first layer of the coil are in contact with the overhang portions of the two end surface insulators, whereby a distance is kept between the coil and the circumferential-direction side surface of the stacked tooth portion. In particular, the winding conductor of the coil is not in contact with the axial end of the slot insulator, and therefore, even if a thin insulating material such as a PET film is used as the slot insulator, an insulation distance can be ensured between the coil and the stacked tooth portion of the divided stacked core. Thus, effects that the performance and quality of the stator are not impaired, the product cost is maintained, and leakage current can be reduced, are obtained.

BRIEF DESCRIPTION OF THE DRAWINGS

FIG. 4 is a perspective view of the divided stacked core to which an insulating member is mounted, according to embodiment 1.

FIG. 12A is a sectional view along line A-A in FIG. 10.

FIG. 12B is an enlarged view of a specific part in FIG. 12A.

DESCRIPTION OF EMBODIMENTS

Hereinafter, a stator for a rotary electric machine according to embodiment 1 will be described with reference to the drawings.

As used herein, unless otherwise stated, an "axial direction", a "circumferential direction", a "radial direction", an "inner circumferential side", an "outer circumferential side", an "inner side", an "outer side", an "inner circumferential surface", and an "outer circumferential surface" respectively refer to an "axial direction", a "circumferential direction", a "radial direction", an "inner circumferential side", an "outer circumferential side", an "inner side", an "outer side", an "inner circumferential surface", and an "outer circumferential surface" of the stator. In addition, as used herein, unless otherwise stated, when "upward" or "downward" is mentioned, a plane perpendicular to the axial direction is assumed at a location as a reference, and using the plane as a border, a side that includes the center point of the stator is defined as "downward" side and the opposite side is defined as "upward" side. In addition, regarding comparison of high and low in height, a position at a long distance from the center of the stator is defined as "high". In the following description, the case of using a divided stacked core will be shown. However, an integrated divisional core may be used.

Embodiment 1

Figure 1:
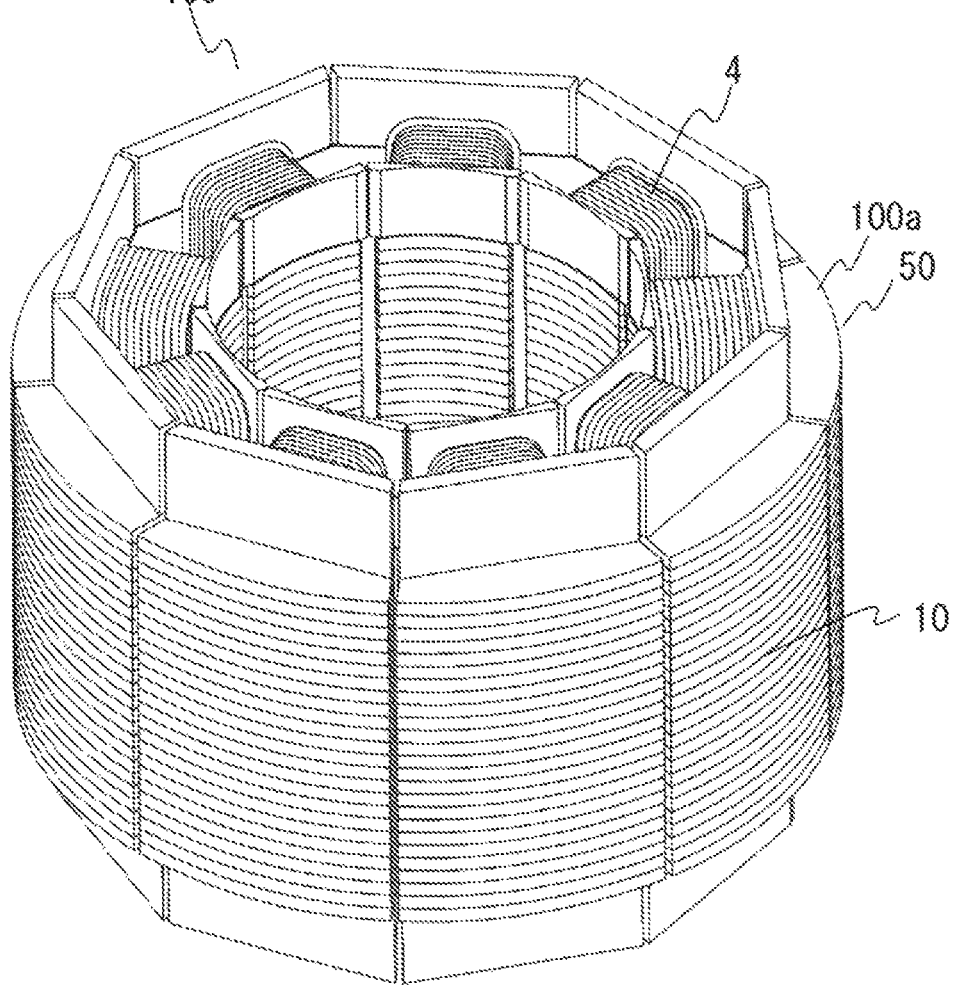
FIG. 1 is a perspective view of a stator for a rotary electric machine according to embodiment 1.
Figure 2:
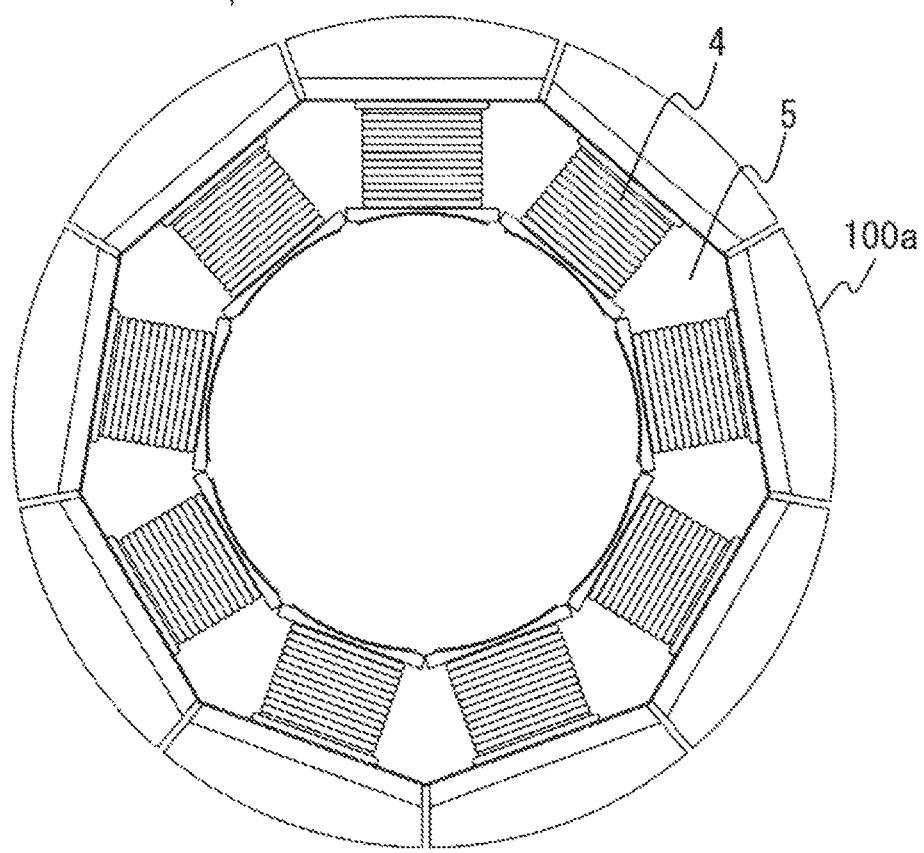
FIG. 2 is a top view of the stator for a rotary electric machine according to embodiment 1.

FIG. 1 is a perspective view of a stator 100 for a rotary electric machine according to embodiment 1. FIG. 2 is a top view of the stator 100.

Figure 3A:
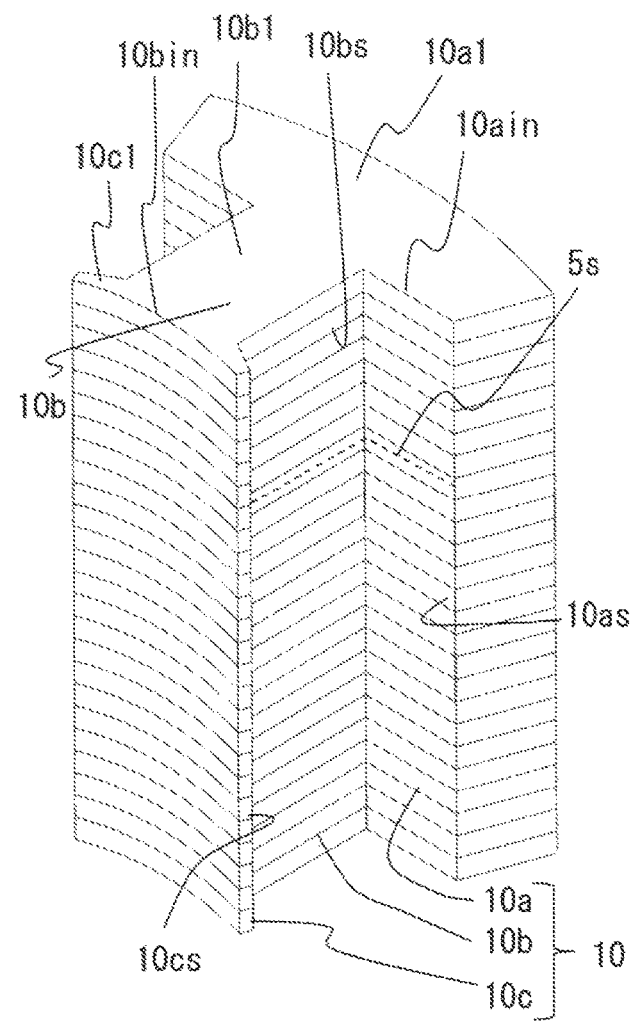
FIG. 3A is a perspective view of a divided stacked core according to embodiment 1.
Figure 3B:
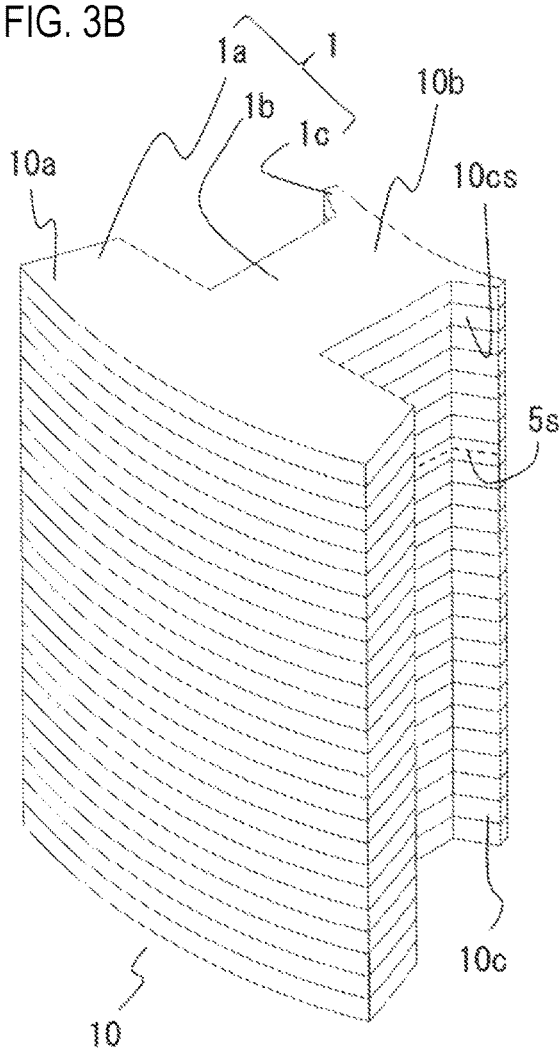
FIG. 3B is a perspective view of the divided stacked core according to embodiment 1.

FIG. 3A and FIG. 3B are perspective views of a divided stacked core 10.

FIG. 3A is a view of the divided stacked core 10 as seen from a stacked tooth portion 10b side, and FIG. 3B is a view of the divided stacked core 10 as seen from a divided stacked yoke portion 10a side.

FIG. 4 is a perspective view of the divided stacked core 10 to which insulating members are mounted.

Figure 5:
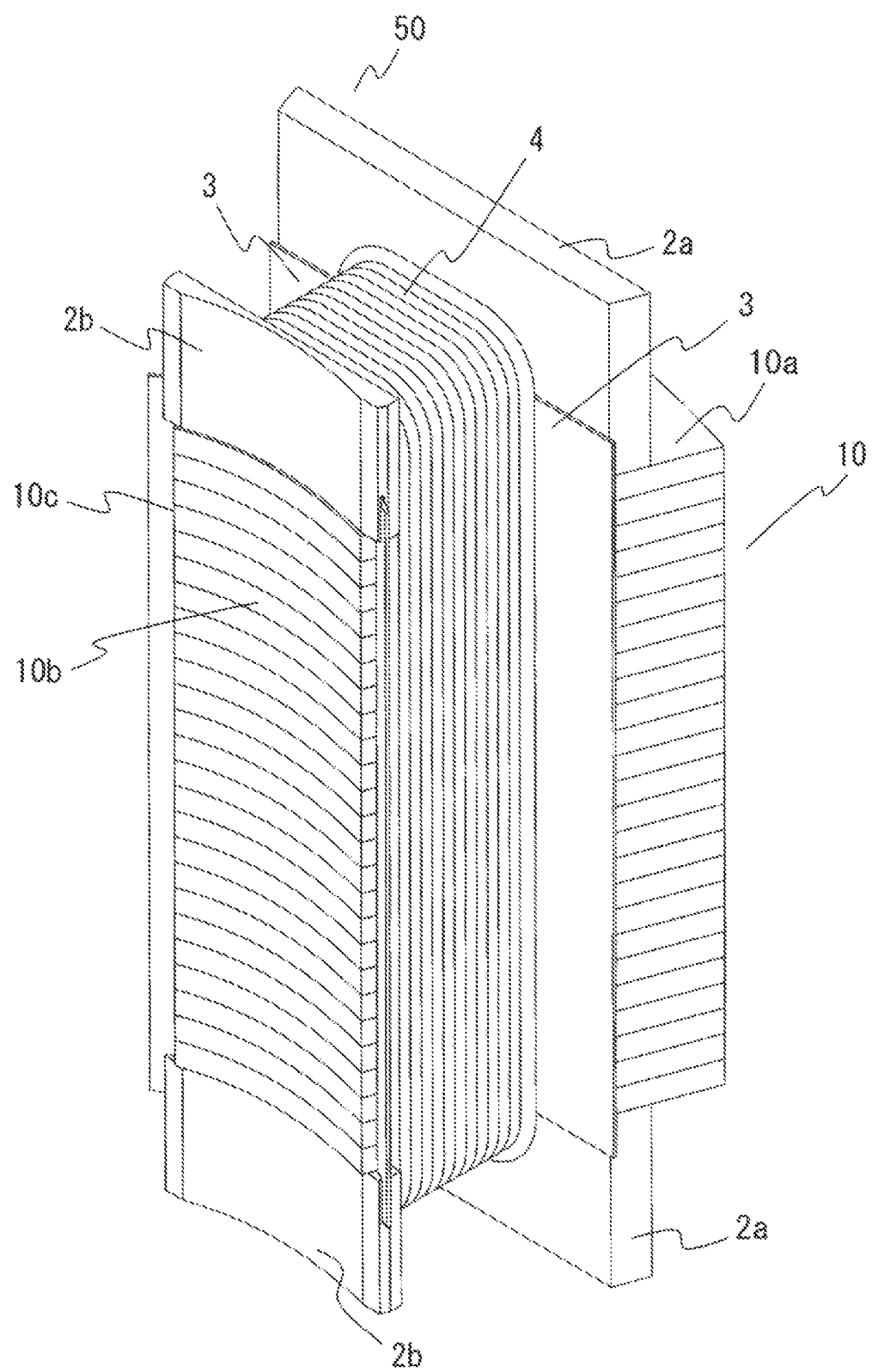
FIG. 5 is a perspective view of the divided stacked core around which a coil is wound, according to embodiment 1.

FIG. 5 is a perspective view of a divided stator 50 around which a coil 4 is wound with the insulating members therebetween.

Figure 6:
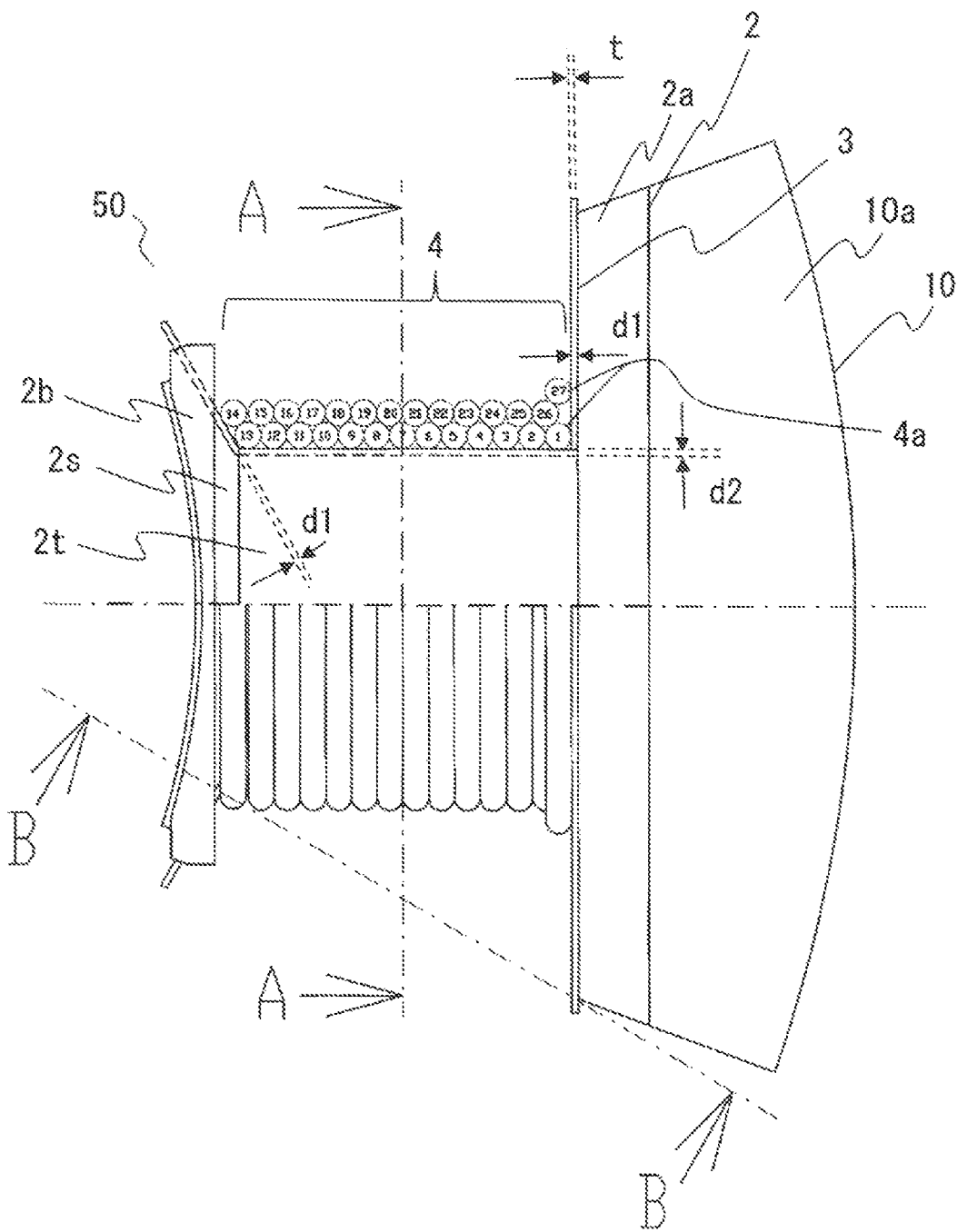
FIG. 6 is a schematic partially-sectional top view of the divided stacked core around which the coil is wound, according to embodiment 1.

FIG. 6 is a schematic partially-sectional top view of the divided stacked core 10 around which the coil 4 is wound with the insulating members therebetween.

Figure 7:
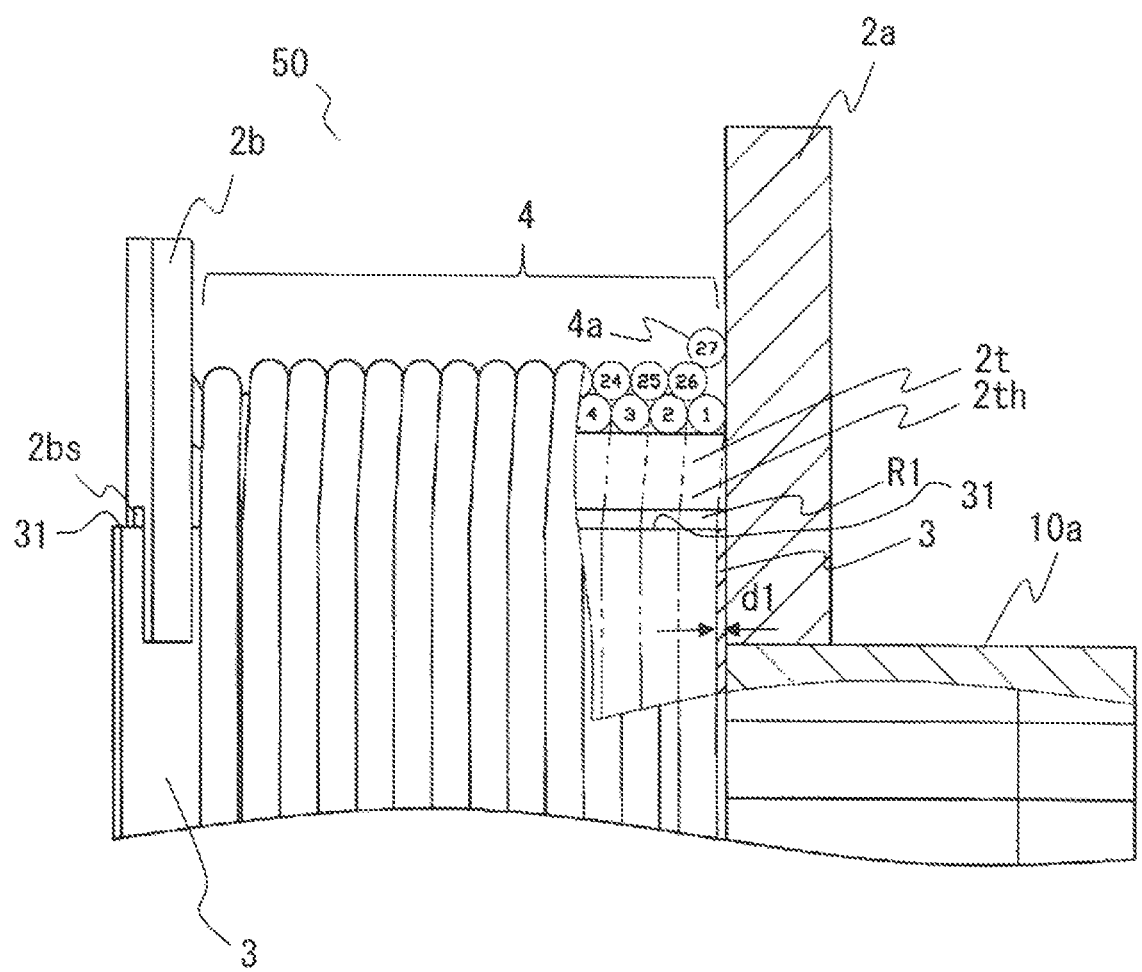
FIG. 7 is a schematic partially-sectional side view of the divided stacked core around which the coil is wound, according to embodiment 1.

FIG. 7 is a schematic partially-sectional side view of the divided stacked core 10 around which the coil 4 is wound with the insulating members therebetween.

Figure 8A:
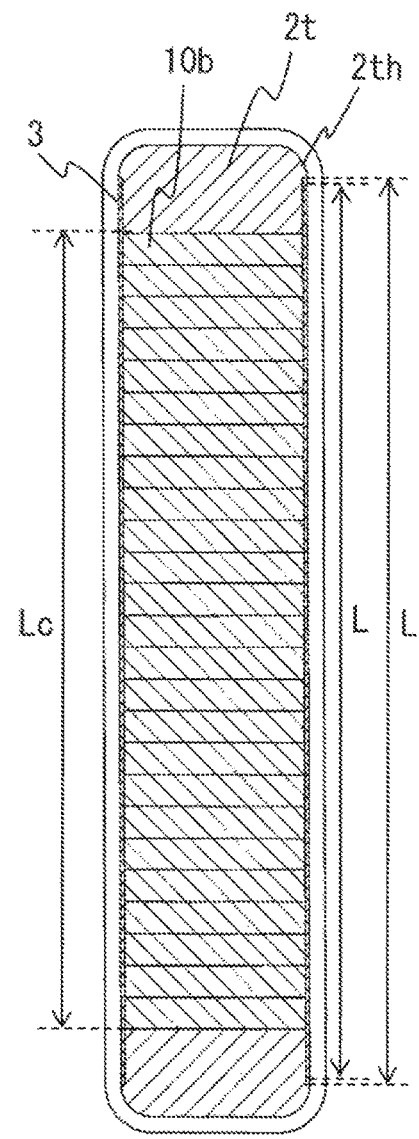
FIG. 8A is a sectional view along line A-A in FIG. 6.

FIG. 8A is a sectional view along line A-A in FIG. 6.

Figure 8B:
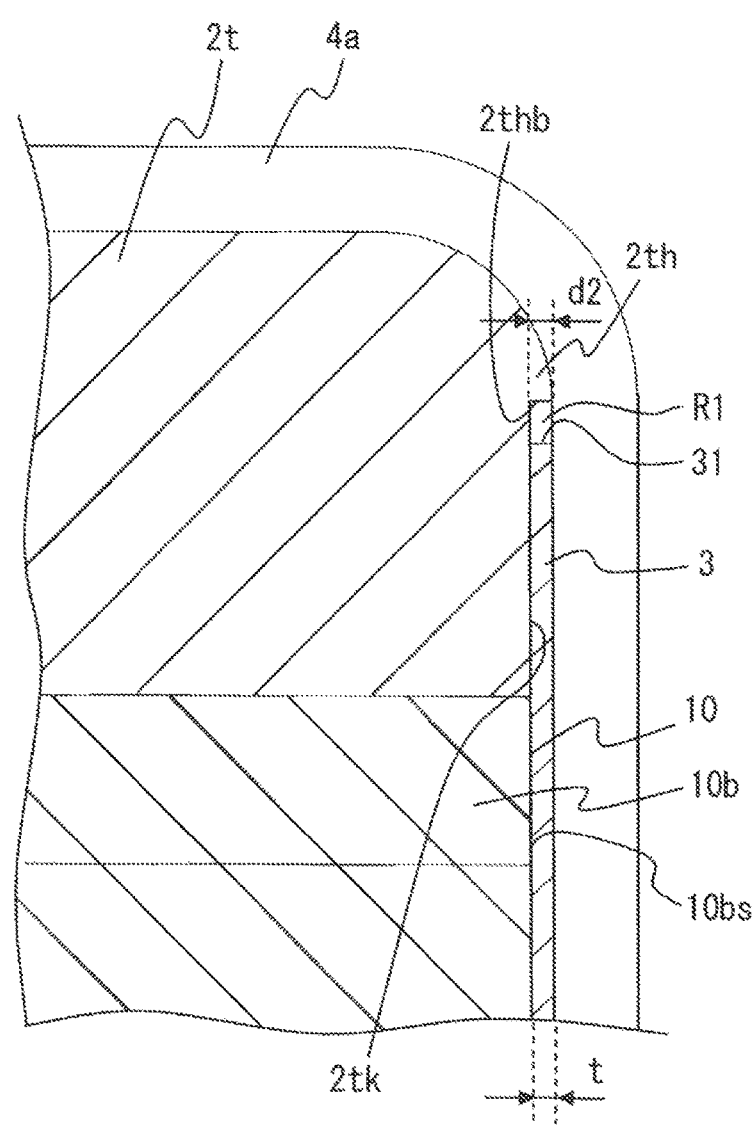
FIG. 8B is an enlarged view of a specific part in FIG. 8A.

FIG. 8B is an enlarged view of a specific part in

FIG. 8A.

Figure 9:
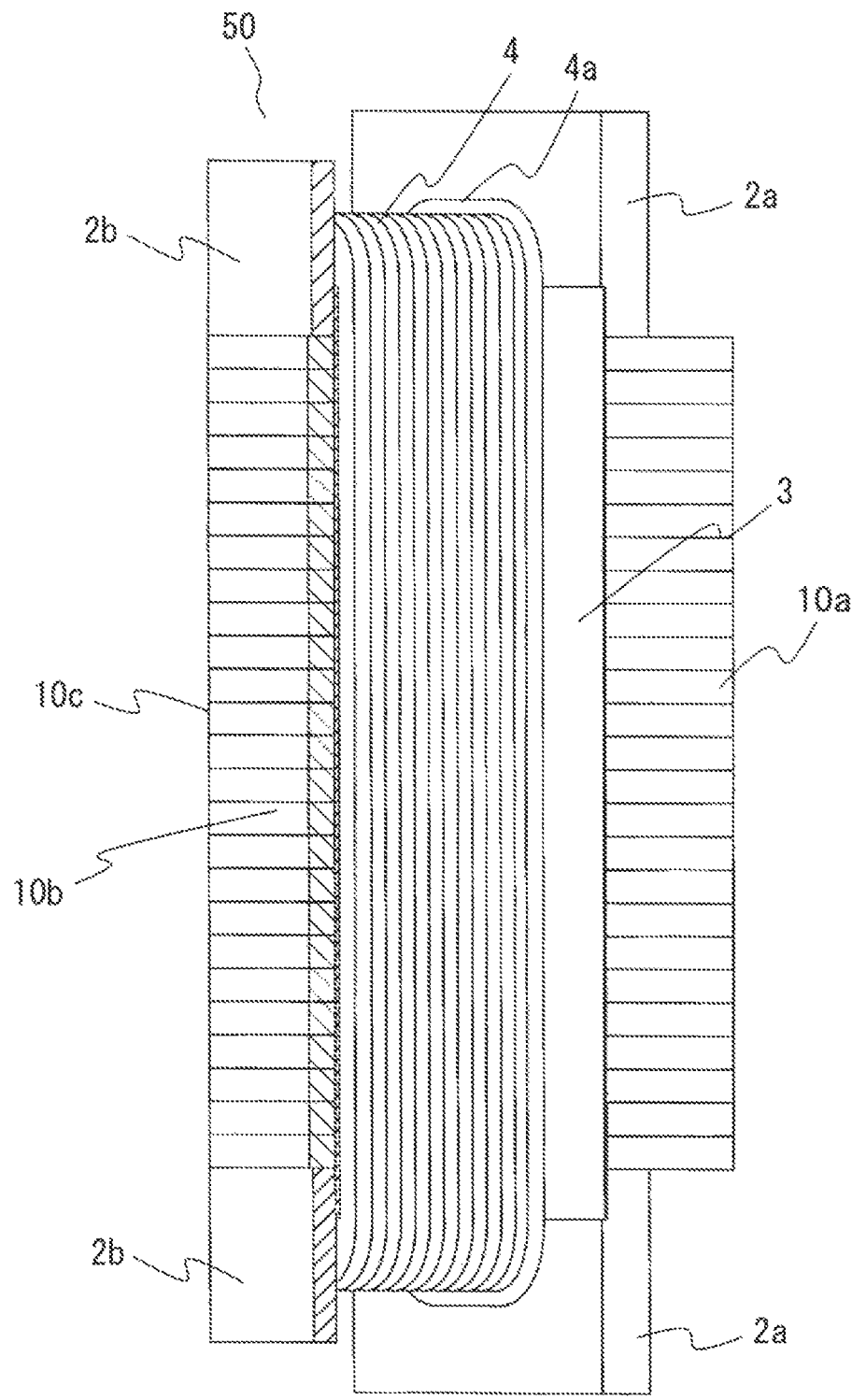
FIG. 9 is a sectional view along line B-B in FIG. 6.

FIG. 9 is a sectional view along line B-B in FIG. 6.

The stator 100 shown in FIG. 1 is formed by combining nine divided stators 50 shown in FIG. 5 into an annular shape. Each divided stator 50 is formed by mounting a plurality of insulating members to the divided stacked core 10 and then winding the coil 4 thereon.

As shown in FIG. 3A and FIG. 3B, the divided stacked core 10 has a divided stacked yoke portion 10a (yoke portion), a stacked tooth portion 10b (tooth portion) protruding inward from the inner circumferential surface of the divided stacked yoke portion 10a, and stacked shoe portions 10c (shoe portions) protruding toward both sides in the circumferential direction from the inner end of the stacked tooth portion 10b. In addition, the divided stacked core 10 is formed by stacking a plurality of magnetic core pieces 1 in the axial direction.

The core piece 1 has a yoke portion 1a which will form the divided stacked yoke portion 10a when being stacked in the axial direction, a tooth portion 1b which will form the stacked tooth portion 10b when being stacked in the axial direction, and shoe portions 1c which will form the stacked shoe portions 10c when being stacked. Nine divided stacked yoke portions 10a are combined in the circumferential direction, to form an annular stacked yoke portion 100a of the stator 100.

As shown in FIG. 4, two of each of two types of insulating members, i.e., a total of four insulating members are mounted to the divided stacked core 10. A first type of insulating members are end surface insulators 2 mounted to both end surfaces in the axial direction of one divided stacked core 10. Identical end surface insulators 2 are mounted one by one to both end surfaces.

The end surface insulator 2 has an outer flange 2a, an inner flange 2b, and a tooth end surface covering portion 2t as shown in FIG. 4, and has a slope portion 2s as shown in FIG. 6. The outer flange 2a covers a predetermined range outward in the radial direction from an edge 10ain on the inner circumferential side on an axial end surface 10a1 of the divided stacked yoke portion 10a shown in FIG. 3A, so as to be in close contact therewith, and stands upward in the axial direction as shown in FIG. 4. The end surface insulator 2 keeps a distance from the coil 4 to the axial end surface 10a1 of the divided stacked core 10 so as to insulate these from each other.

The inner flange 2b covers axial end surfaces 10c1 of the stacked shoe portions 10c and a predetermined range outward in the radial direction from an edge 10bin on the inner circumferential side of the stacked tooth portion 10b shown in FIG. 3A, so as to be in close contact therewith, and stands upward in the axial direction as shown in FIG. 4.

The outer-circumferential-side end of the tooth end surface covering portion 2t is connected to the outer flange 2a, and the inner-circumferential-side end thereof is connected to the inner flange 2b via the slope portion 2s which expands radially inward in a taper shape. The tooth end surface covering portion 2t covers the axial end surface 10b1 of the stacked tooth portion 10b between the outer flange 2a and the inner flange 2b, so as to be in close contact therewith. It is noted that the slope portion 2s also covers the axially upper surfaces of base parts of the stacked shoe portions 10c. When the end surface insulators 2 are mounted to both end surfaces in the axial direction of the divided stacked core 10, the two end surface insulators 2 as a pair serve as a winding frame for the coil 4.

A second type of insulating members are slot insulators 3. The slot insulator 3 is an insulating member for covering three surfaces, i.e., an inner side surface 10as of the divided stacked yoke portion 10a, a circumferential-direction side surface 10bs of the stacked tooth portion 10b, and an outer side surface 10cs of the stacked shoe portion 10c as shown in FIG. 3A. The slot insulator 3 is provided seamlessly along the surface 5s of the slot 5 which accommodates a coil. Owing to the slot insulator 3, in the slot 5 of the divided stacked core 10, an insulation distance corresponding to the thickness of the slot insulator 3 can be ensured between the coil 4 and the surface 5s of the slot 5 of the divided stacked core 10. Two identical slot insulators 3 are mounted to one divided stacked core 10 so as to sandwich the stacked tooth portion 10b. It is noted that the slot insulator 3 is made from a thin insulating material such as a polyethylene terephthalate (PET) film.

As shown in FIG. 4, an axial end 31 of a part, of the slot insulator 3, that is fitted along the outer side surface 10cs of the stacked shoe portion 10c is fixed by being inserted, from below, into a slit 2bs formed in the axial direction at a lower end of a circumferential-direction end of the inner flange 2b.

As shown in FIG. 6, one winding conductor 4a at the first turn (No. 1) in the first layer of the coil 4 is wound along the outer flange 2a on the outermost circumferential side of the tooth end surface covering portion 2t of the end surface insulator 2. The winding conductor 4a at the second and subsequent turns (No. 2 to No. 12) is sequentially wound on the surface of the tooth end surface covering portion 2t toward the inner flange 2b side with the slot insulators 3 interposed.

Then, the winding conductor 4a at the final turn (No. 13) in the first layer of the coil 4 is wound in contact with both of the slope portion 2s formed at the boundary between the tooth end surface covering portion 2t and the inner flange 2b of the end surface insulator 2, and the tooth end surface covering portion 2t, whereby the first layer of the coil 4 is formed.

The winding conductor 4a at the first turn (No. 14) in the second layer of the coil 4 is wound in contact with both of the winding conductor 4a at the final turn (No. 13) in the first layer and the slope portion 2s. Then, the winding conductor 4a at the subsequent turns (No. 15 to No. 26) to form the second layer of the coil 4 is sequentially wound outward in the radial direction in contact with both of the adjacent two turns of the winding conductor 4a in the first layer, so as to be stacked in a staggered form on the first layer of the coil 4.

Here, on the radially outer side of the winding conductor 4a at the final turn (No. 26) in the second layer, there is no space corresponding to the diameter of the winding conductor 4a. Therefore, the winding conductor 4a at the first turn (No. 27) in the third layer is wound in contact with both of the winding conductor 4a at the final turn (No. 26) in the second layer and the outer flange 2a. Then, the third layer of the coil 4 is stacked in a staggered form in the same manner as in the second layer.

At this time, in the slot 5, the first turns (No. 1 and No. 27) of the winding conductor 4a in the first and third layers of the coil 4 are in contact with the slot insulator 3 mounted along the surface 5s of the slot 5. Therefore, as shown in FIG. 6 and FIG. 7, a distance d1 equal to a thickness t of the slot insulator 3 is kept between the divided stacked yoke portion 10a of the divided stacked core 10 and the coil 4.

As shown in FIG. 8B, both ends in the circumferential direction of the axial end of the tooth end surface covering portion 2t are gently chamfered. In addition, in a predetermined range on the stacked tooth portion 10b side on both side surfaces in the circumferential direction of the tooth end surface covering portion 2t, cutouts 2tk (first cutouts) recessed in the circumferential direction are formed so as to extend in the radial direction. Thus, of the tooth end surface covering portion 2t, a part axially upward of the cutouts 2tk protrudes so as to overhang in the circumferential direction. This part is referred to as overhang portion 2th. The width in the circumferential direction of the tooth end surface covering portion 2t at the cutouts 2tk is the same as the width in the circumferential direction of the divided stacked core 10.

A distance d2 by which the overhang portion 2th protrudes in the circumferential direction is equal to or greater than the thickness t of the slot insulator 3. Therefore, the plural turns (No. 1 to No. 13) of the winding conductor 4a in the first layer of the coil 4 are wound over the slot insulator 3 so as to extend across in the axial direction between the overhang portions 2th of the two end surface insulators 2, and thus the distance d2 is kept between the stacked tooth portion 10b and the coil 4.

The final turn (No. 13) of the winding conductor 4a in the first layer of the coil 4 and the first turn (No. 14) of the winding conductor 4a in the second layer of the coil 4 are in contact with the slot insulator 3, so that the distance d1 equal to the thickness t of the slot insulator 3 is kept between the stacked shoe portion 10c and the coil 4.

As shown in FIG. 8A, a length L in the axial direction of the slot insulator 3 is greater than a length Lc in the axial direction of the divided stacked core 10. Where a length between the overhang portions 2th opposite to each other in the axial direction, of the two end surface insulators 2, is denoted by Ld, the length L in the axial direction of the slot insulator 3 is equal to or smaller than the length Ld, and thus the slot insulator 3 is accommodated between the overhang portions 2th of the two end surface insulators 2. In addition, in the case of L<Ld, as shown in FIG. 8B, a space R1 as a gap is ensured between the axial end 31 of the slot insulator 3 and an axially lower surface 2thb of the overhang portion 2th. This space R1 helps to prevent the slot insulator 3 from being wrinkled when the coil 4 is wound.

In the stator 100 for a rotary electric machine according to embodiment 1, plural turns of the winding conductor 4a in the first layer of the coil 4 are in contact with the overhang portions 2th of the two end surface insulators 2, whereby a distance is kept between the circumferential-direction side surface 10bs of the stacked tooth portion 10b and the coil 4. In particular, the winding conductor 4a of the coil 4 is not in contact with the axial end 31 of the slot insulator 3, and therefore, even if a thin insulating material such as a PET film is used as the slot insulator 3, an insulation distance can be ensured between the coil 4 and the stacked tooth portion 10b of the divided stacked core 10. Thus, effects that the performance and quality of the stator 100 are not impaired, the product cost is maintained, and leakage current can be reduced, are obtained.

Embodiment 2

Hereinafter, a stator for a rotary electric machine according to embodiment 2 will be described focusing on a difference from embodiment 1, with reference to the drawings.

Figure 10:
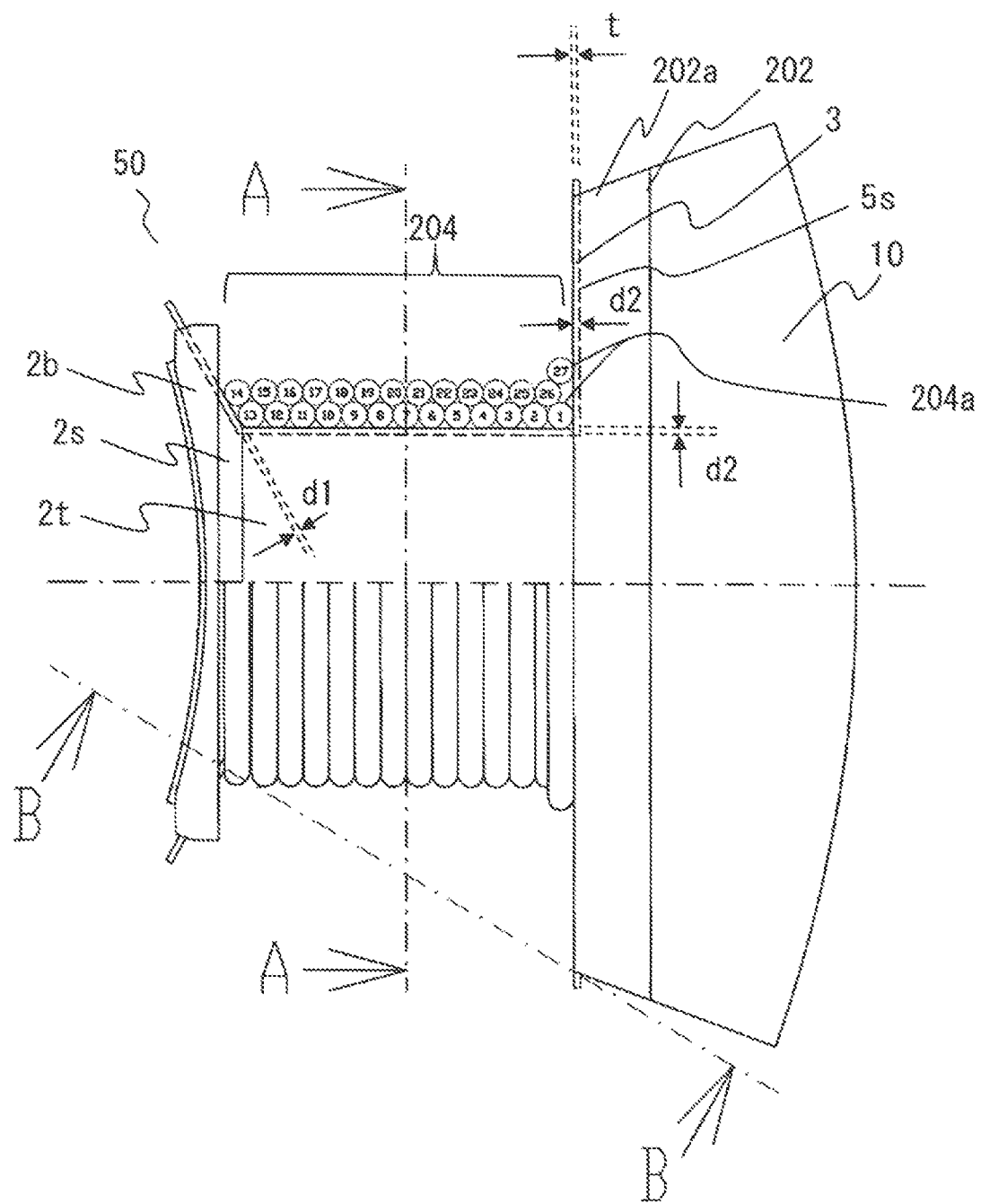
FIG. 10 is a schematic partially-sectional top view of a divided stacked core around which a coil is wound, according to embodiment 2.

FIG. 10 is a schematic partially-sectional top view of the divided stacked core 10 around which a coil 204 is wound with insulating members therebetween.

Figure 11:
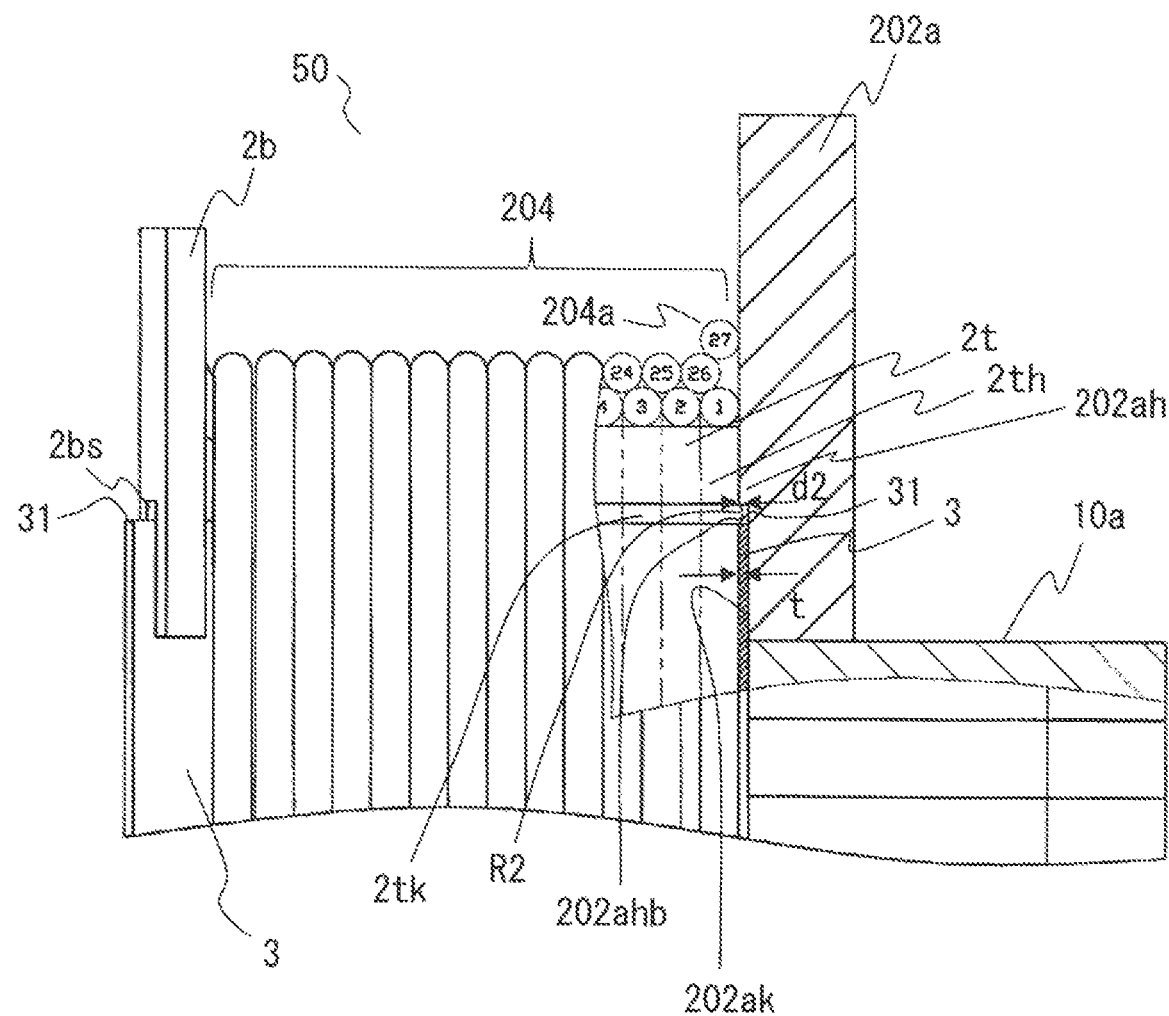
FIG. 11 is a schematic partially-sectional side view of the divided stacked core around which the coil is wound, according to embodiment 2.

FIG. 11 is a schematic partially-sectional side view of the divided stacked core 10 around which the coil 204 is wound with the insulating members therebetween.

FIG. 12A is a sectional view along line A-A in FIG. 10.

FIG. 12B is an enlarged view of a specific part in FIG. 12A.

Figure 13:
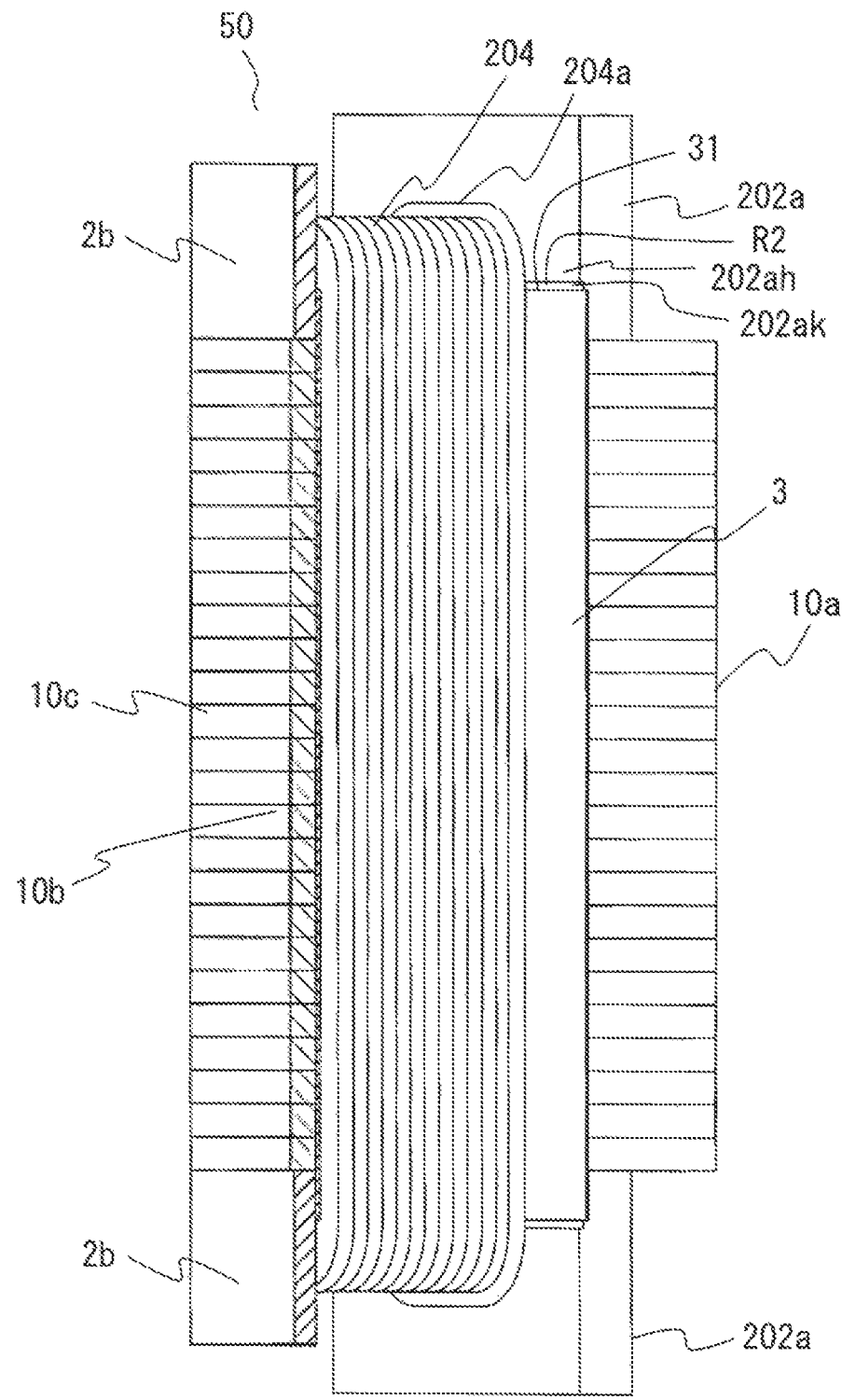
FIG. 13 is a sectional view along line B-B in FIG. 10.

FIG. 13 is a sectional view along line B-B in FIG. 10.

The difference between embodiment 1 and embodiment 2 is that, as shown in FIG. 11, an outer flange 202a of an end surface insulator 202 also has an overhang portion 202ah (second overhang portion) and a cutout 202ak (second cutout).

As shown in FIG. 10, one winding conductor 204a at the first turn (No. 1) in the first layer of the coil 204 is wound along an outer flange 220a on the outermost circumferential side of the tooth end surface covering portion 2t of the end surface insulator 202. The winding conductor 204a at the second and subsequent turns (No. 2 to No. 12) is sequentially wound on the surface of the tooth end surface covering portion 2t toward the inner flange 2b side with the slot insulators 3 interposed.

Then, the winding conductor 204a at the final turn (No. 13) in the first layer of the coil 204 is wound in contact with both of the slope portion 2s formed at the boundary between the tooth end surface covering portion 2t and the inner flange 2b of the end surface insulator 202, and the tooth end surface covering portion 2t, whereby the first layer of the coil 204 is formed.

The winding conductor 204a at the first turn (No. 14) in the second layer of the coil 204 is wound in contact with both of the winding conductor 204a at the final turn (No. 13) in the first layer and the slope portion 2s. Then, the winding conductor 204a at the subsequent turns (No. 15 to No. 26) to form the second layer of the coil 204 is sequentially wound outward in the radial direction in contact with both of the adjacent two turns of the winding conductor 204a in the first layer, so as to be stacked in a staggered form on the first layer of the coil 204.

Here, on the radially outer side of the winding conductor 204a at the final turn in the second layer, there is no space corresponding to the diameter of the winding conductor 204a. Therefore, the winding conductor 204a at the first turn (No. 27) in the third layer is wound in contact with both of the winding conductor 204a at the final turn (No. 26) in the second layer and the outer flange 2a. Then, the third layer of the coil 204 is stacked in a staggered form in the same manner as in the second layer, and the winding conductor 204a at the final turn is wound in the same manner as in the final turn in the first layer.

As shown in FIG. 12B, both ends in the circumferential direction of the axial end of the tooth end surface covering portion 2t are gently chamfered, and a part corresponding to both ends in the circumferential direction protrudes so as to overhang in the circumferential direction relative to the cutouts 2tk with which the slot insulators 3 come into contact.

This part is referred to as overhang portion 2th. The width in the circumferential direction of the tooth end surface covering portion 2t at the cutouts 2tk is the same as the width in the circumferential direction of the divided stacked core 10.

A distance d2 by which the overhang portion 2th protrudes in the circumferential direction is equal to or greater than the thickness t of the slot insulator 3. Therefore, the plural turns (No. 1 to 13) of the winding conductor 204a in the first layer of the coil 204 are wound over the slot insulator 3 so as to extend across in the axial direction between the overhang portions 2th of the two end surface insulators 202, and thus the distance d2 is kept between the stacked tooth portion 10b and the coil 204.

The final turn (No. 13) of the winding conductor 204a in the first layer of the coil 204 and the first turn (No. 14) of the winding conductor 204a in the second layer of the coil 204 are in contact with the slot insulator 3 that covers the outer side surface 10cs on the stacked shoe portion 10c, so that the distance d1 equal to the thickness t of the slot insulator 3 is kept between the stacked shoe portion 10c and the coil 204.

As shown in FIG. 12A, the length L in the axial direction of the slot insulator 3 is greater than the length Lc in the axial direction of the divided stacked core 10. Where a length between the overhang portions 2th opposite to each other in the axial direction, of the two end surface insulators 202, is denoted by Ld, the length L in the axial direction of the slot insulator 3 is equal to or smaller than the length Ld. In the case of L<Ld, as shown in FIG. 12B, a space R1 is ensured between the axial end 31 of the slot insulator 3 and the axially lower surface 2thb of the overhang portion 2th. This space R1 helps to prevent the slot insulator 3 from being wrinkled when the coil 204 is wound.

At this time, in the slot 5, as shown in FIG. 11 and FIG. 13, the winding conductor 204a at the first turns (No. 1 and No. 27) in the first layer and the third layer of the coil 204 is wound along the inner wall surface of the outer flange 202a.

As shown in FIG. 11, in a predetermined range on the divided stacked yoke portion 10a side on the radially inner side surface of the outer flange 202a, a cutout 202ak (second cutout) recessed outward in the radial direction is provided outward in the circumferential direction and contiguously to the cutout 2tk of the tooth end surface covering portion 2t. A part axially upward of the cutout 202ak is the overhang portion 202ah protruding inward in the radial direction.

The distance d2 by which the overhang portion 202ah protrudes inward in the radial direction is equal to or greater than the thickness t of the slot insulator 3. Therefore, the winding conductor 204a at the first turn (No. 1) in the first layer of the coil 204 and the winding conductor 204a at the first turn (No. 27) in the third layer are wound over the slot insulator 3 so as to extend across in the axial direction between the overhang portions 202ah of the two end surface insulators 202, and thus the distance d2 is kept between the inner side surface 10as of the divided stacked yoke portion 10a and the coil 204.

At this time, a space R2 similar to the space R1 described in embodiment 1 is ensured between the axial end 31 of the slot insulator 3 and an axially lower surface 202ahb of the overhang portion 202ah. This space R2 helps to prevent the slot insulator 3 from being wrinkled when the coil 204 is wound.

In the stator for a rotary electric machine according to embodiment 2, in addition to the effects described in embodiment 1, the following effects are obtained. In the slot 5, the winding conductor 204a at the first turns (No. 1 and No. 27) in the first layer and the third layer of the coil 204 is wound so as to extend across in the axial direction between the overhang portions 202ah of the two outer flanges 202a, whereby the distance d2 equal to or greater than the thickness t of the slot insulator 3 is kept between the inner side surface 10as of the divided stacked yoke portion 10a and the coil 204. Thus, also at the radially inner side part of the divided stacked yoke portion 10a on the surface 5s of the slot, the winding conductor 204a of the coil 204 is not in contact with the axial end 31 of the slot insulator 3, and therefore, even if a thin insulating material such as a PET film is used as the slot insulator 3, an insulation distance can be ensured between the coil 204 and the inner side surface 10as of the divided stacked yoke portion 10a of the divided stacked core 10. Thus, effects that the performance and quality of the stator are not impaired, the product cost is maintained, and leakage current can be reduced, are obtained.

Embodiment 3

Figure 14:
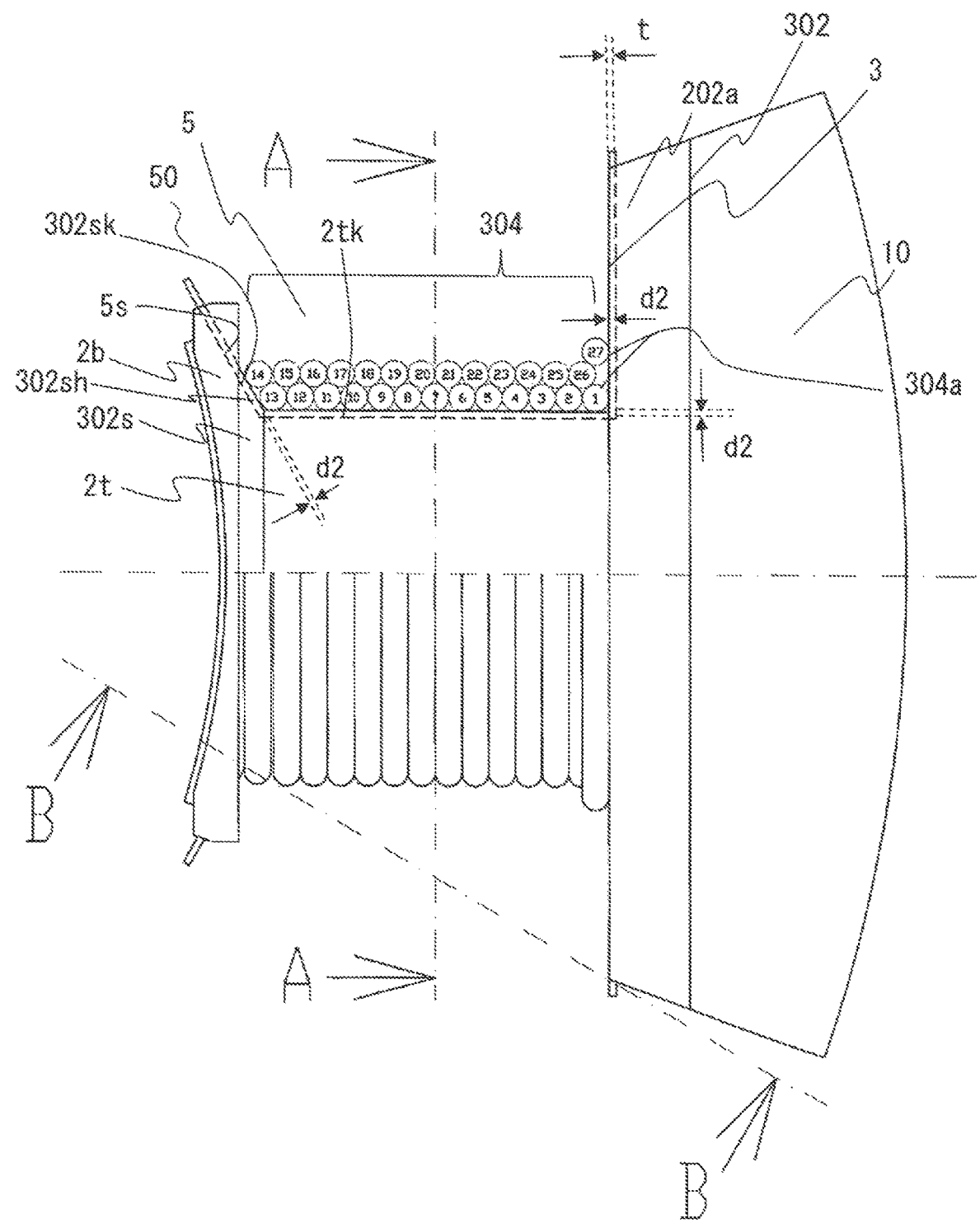
FIG. 14 is a schematic partially-sectional top view of a divided stacked core around which a coil is wound, according to embodiment 3.

Hereinafter a stator for a rotary electric machine according to embodiment 3 will be described focusing on a difference from embodiment 2, with reference to the drawings. FIG. 14 is a schematic partially-sectional top view of the divided stacked core 10 around which a coil 304 is wound with insulating members therebetween.

Figure 15:
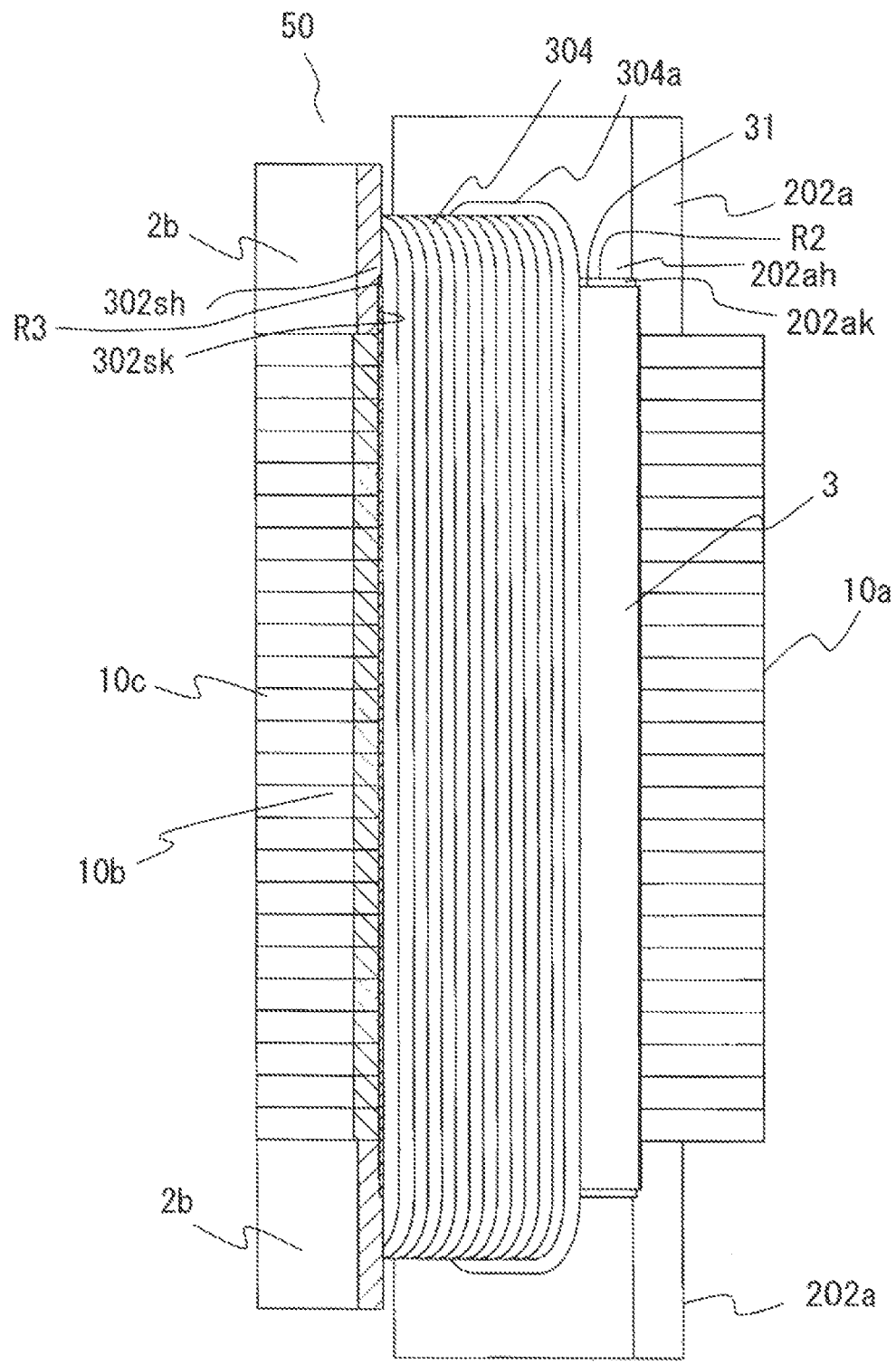
FIG. 15 is a sectional view along line B-B in FIG. 14.

FIG. 15 is a sectional view along line B-B in FIG. 14.

The difference between embodiment 2 and embodiment 3 is that, as shown in FIG. 14 and FIG. 15, a circumferential-direction side surface of a slope portion 302s of an end surface insulator 302 also has an overhang portion 302sh (third overhang portion) and a cutout 302sk (third cutout).

As shown in the drawings, on the circumferential-direction side surface of the slope portion 302s, the cutout 302sk having a recessed surface is provided contiguously to the cutout 2tk of the tooth end surface covering portion 2t. A part axially upward of the cutout 302sk is the overhang portion 302sh protruding into the slot 5.

The distance d2 by which the overhang portion 302sh protrudes into the slot 5 is equal to or greater than the thickness t of the slot insulator 3. Therefore, the winding conductor 304a at the final turn (No. 13) in the first layer and the winding conductor 304a at the first turn (No. 14) in the second layer of the coil 304 are wound over the slot insulator 3 so as to extend across in the axial direction between the overhang portions 302sh of the two end surface insulators 202, and thus the distance d2 is kept between the outer side surface 10cs of the stacked shoe portion 10c and the coil 304.

At this time, a space R3 similar to the spaces R1, R2 described in embodiments 1, 2 is ensured between the axial end 31 of the slot insulator 3 and the axially lower surface of the overhang portion 302sh. This space R3 helps to prevent the slot insulator 3 from being wrinkled when the coil 304 is wound.

In the stator for a rotary electric machine according to embodiment 3, in addition to the effects described in embodiments 1, 2, the following effects are obtained. In the slot 5, the winding conductor 304a at the final turn (No. 13)

in the first layer of the coil 304 and the winding conductor 304a at the first turn (No. 14) in the second layer are wound across in the axial direction between the overhang portions 302sh of the two slope portions 302s, and thus the distance d2 equal to or greater than the thickness t of the slot insulator 3 is kept between the outer side surface 10cs of the stacked shoe portion 10c and the coil 304. Thus, also at the radially outer side part of the stacked shoe portion 10c on the surface 5s of the slot 5, the winding conductor 304a of the coil 304 is not in contact with the axial end 31 of the slot insulator 3, and therefore, even if a thin insulating material such as a PET film is used as the slot insulator 3, an insulation distance can be ensured between the coil 304 and the outer side surface 10cs of the stacked shoe portion 10c of the divided stacked core 10. Thus, effects that the performance and quality of the stator are not impaired, the product cost is maintained, and leakage current can be reduced, are obtained.

Embodiment 4

Hereinafter, a stator for a rotary electric machine according to embodiment 4 will be described focusing on a difference from embodiment 3, with reference to the drawings.

Figure 16:
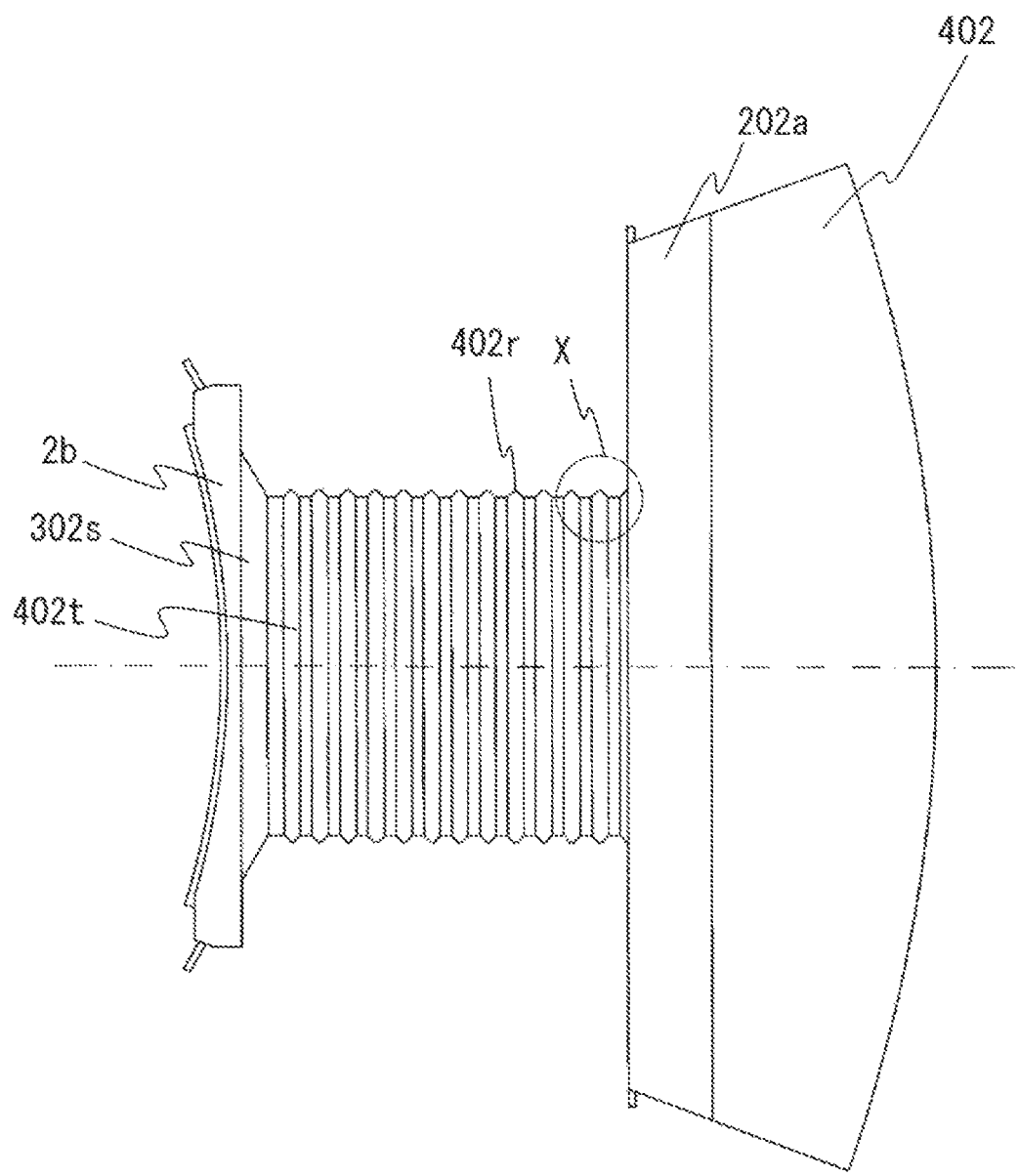
FIG. 16 is a top view of a divided stacked core to which insulating members are mounted, according to embodiment 4.

FIG. 16 is a top view of a divided stacked core 10 to which insulating members are mounted.

Figure 17:
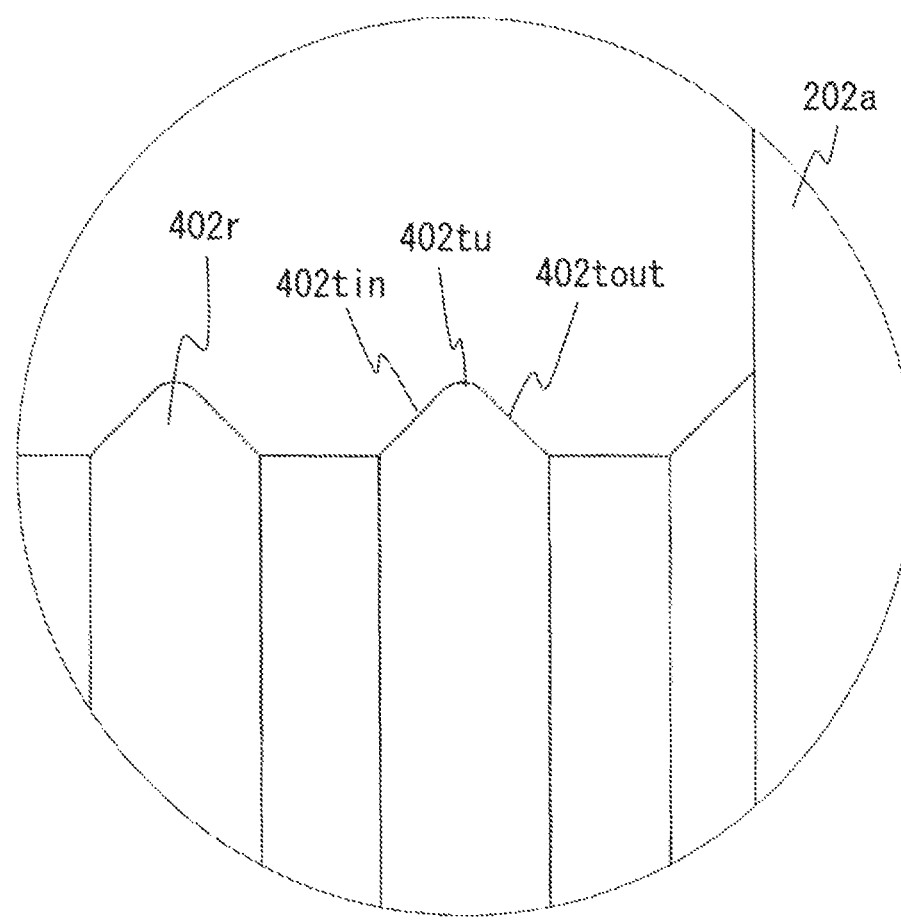
FIG. 17 is an enlarged view of a specific part enclosed by circle mark X in FIG. 18.

FIG. 17 is an enlarged view of a specific part enclosed by circle mark X in FIG. 16.

Figure 18:
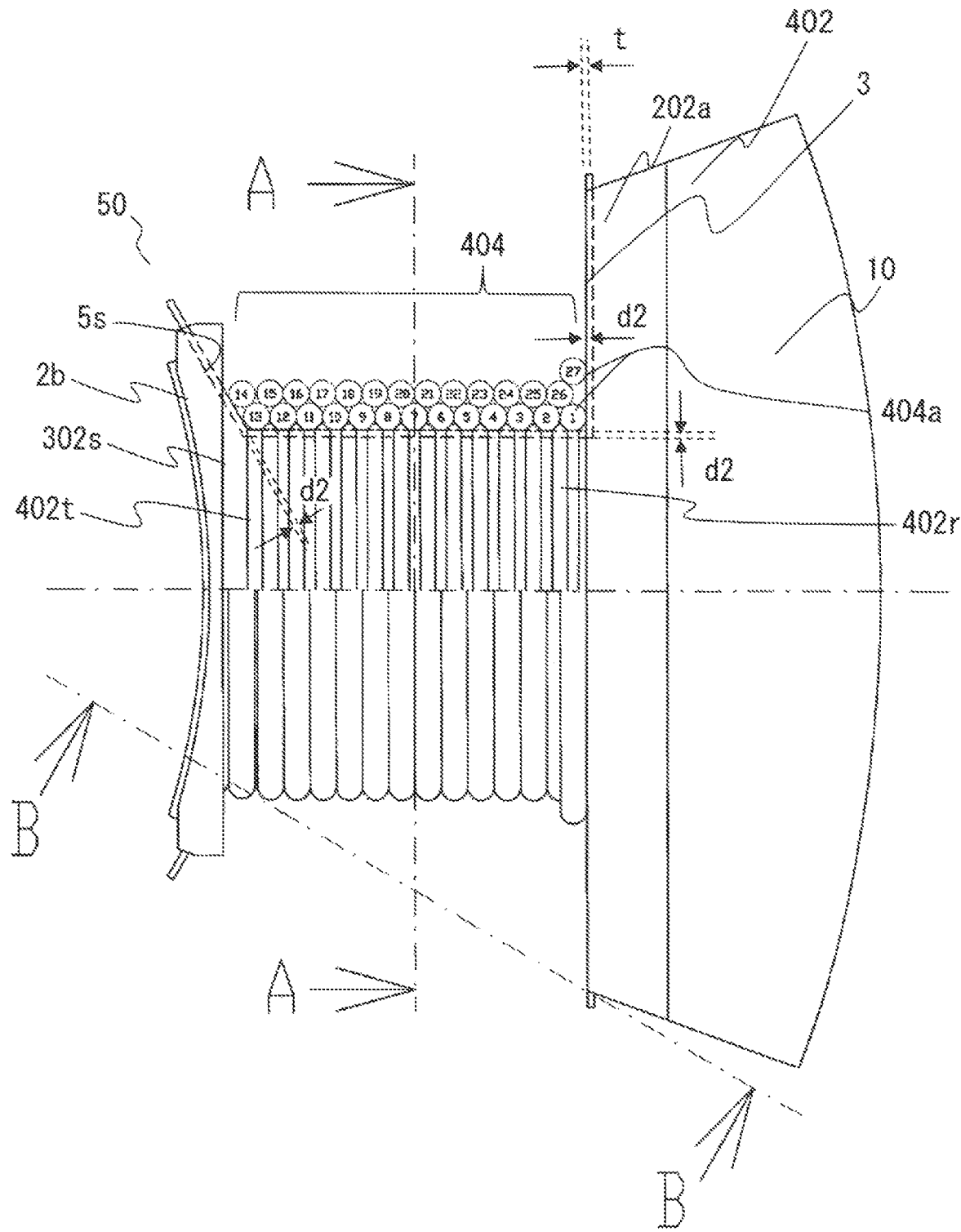
FIG. 18 is a schematic partially-sectional top view of the divided stacked core around which a coil is wound, according to embodiment 4.

FIG. 18 is a schematic partially-sectional top view of the divided stacked core 10 around which a coil 404 is wound with insulating members therebetween.

Figure 19:
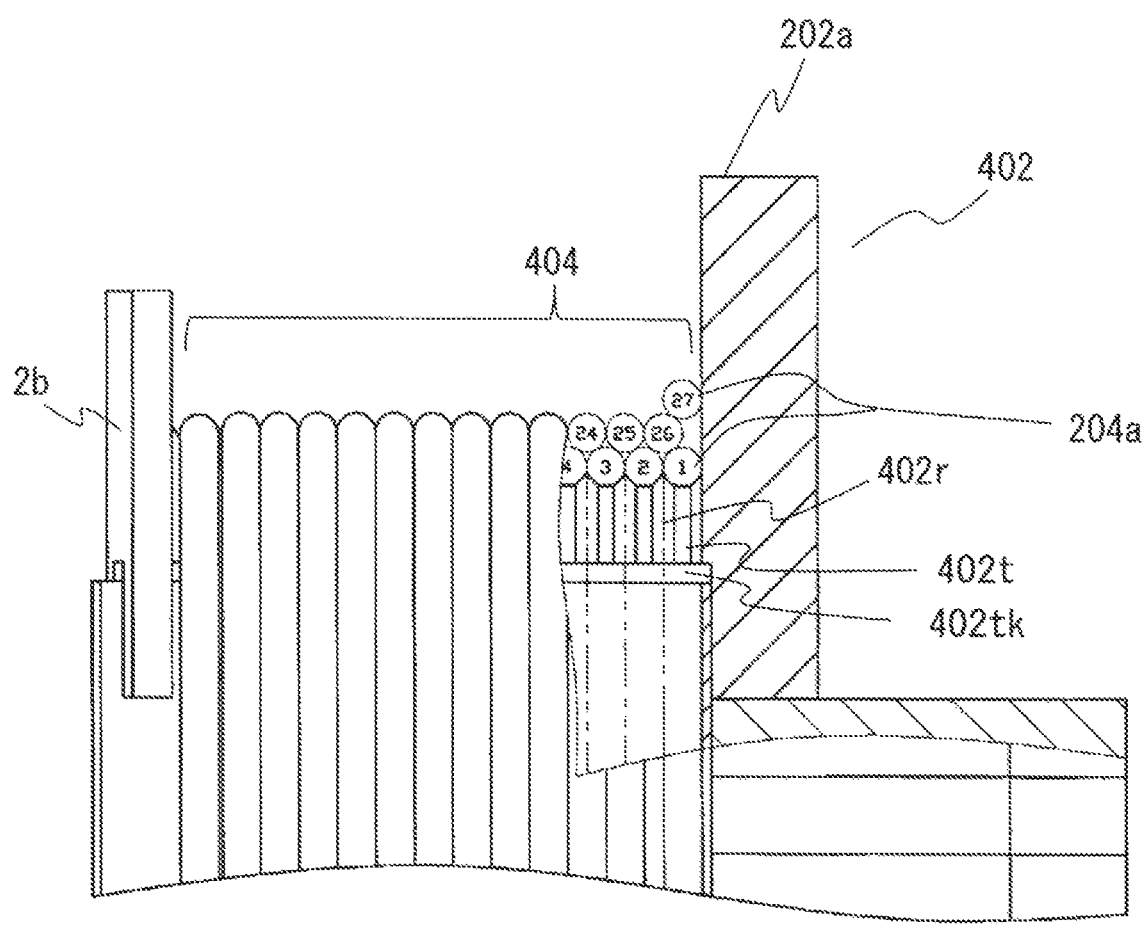
FIG. 19 is a schematic partially-sectional side view of the divided stacked core around which the coil is wound, according to embodiment 4.

FIG. 19 is a schematic partially-sectional side view of the divided stacked core 10 around which the coil 404 is wound with the insulating members therebetween.

Figure 20A:
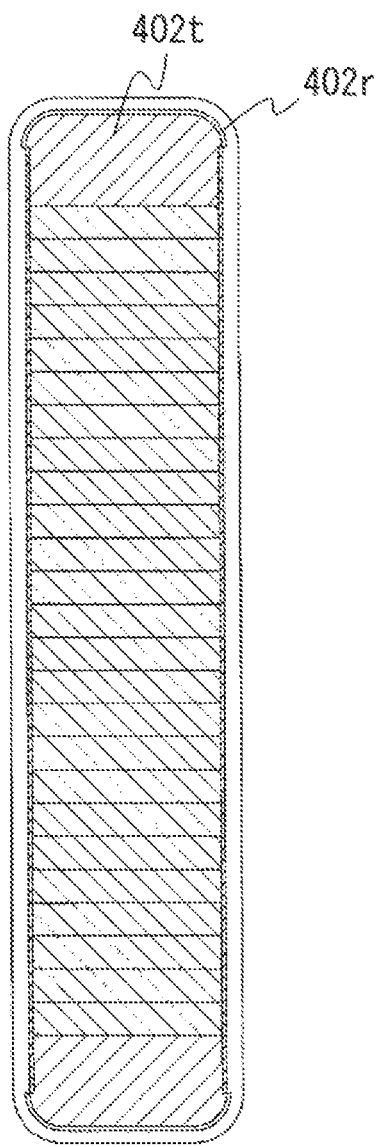
FIG. 20A is a sectional view along line A-A in FIG. 18.

FIG. 20A is a sectional view along line A-A in FIG. 18.

Figure 20B:
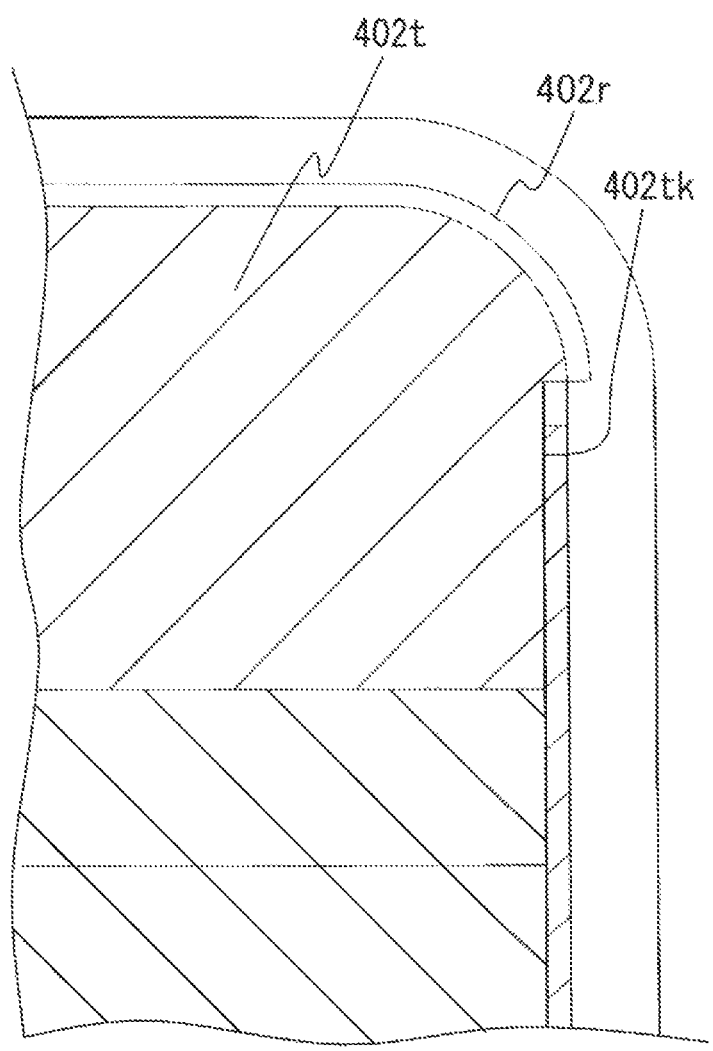
FIG. 20B is an enlarged view of a specific part in FIG. 20A.

FIG. 20B is an enlarged view of a specific part in FIG. 20A.

The difference between embodiment 3 and embodiment 4 is that, as shown in FIG. 16 and FIG. 19, at a part upward of cutouts 402tk on the surface of a tooth end surface covering portion 402t of the end surface insulator 402, a projection 402r for positioning one winding conductor 404a by engaging therewith in the radial direction is provided in the same direction as the winding direction of the coil 404.

A plurality of projections 402r are formed in the circumferential direction at regular intervals from the outer flange 202a to the inner flange 2b. As shown in FIG. 17, a plane surface obliquely formed on the inner side of the projection 402r is a slope plane portion 402tin. In addition, a plane surface obliquely formed on the outer side of the projection 402r symmetrically in the radial direction with respect to a top portion 402tu of the projection 402r is a slope plane portion 402tout. The top portion 402tu is chamfered so as not to damage the insulation coat of the winding conductor 404a when the winding conductor 404a is wound.

One winding conductor 404a at the first turn (No. 1) in the first layer of the coil 404 is wound along the outer flange 202a on the outermost circumferential side of the tooth end surface covering portion 2t of the end surface insulator 2. At this time, the radially inner side of the winding conductor 404a is engaged with the projection 402r. The winding conductor 404a at the second and subsequent turns (No. 2 to No. 12) is sequentially wound toward the inner flange 2b side so as to be engaged on both sides in the radial direction between the projections 402r adjacent to each other in the radial direction.

Then, the winding conductor 4a at the final turn (No. 13) in the first layer of the coil 404 is wound in contact with both of the slope portion 2s formed at the boundary between the inner flange 2b and the tooth end surface covering portion 2t of the end surface insulator 2, and the tooth end surface covering portion 2t, while being engaged with the projection 402r on the outer side in the radial direction.

In the stator for a rotary electric machine according to embodiment 4, in addition to the effects described in embodiment 1, the following effects are obtained. The winding conductor 404a at each turn forming the first layer is regularly engaged with the projections 402r, and therefore the winding conductor 404a at each turn in the second layer can be wound regularly between the radially adjacent turns of the winding conductor 404a in the first layer. Similarly, the third layer can also be wound regularly. Thus, it is possible to provide a stator for a rotary electric machine having no risk of occurrence of winding disorder and having excellent insulation property.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 100 stator
100a stacked yoke portion
1 core piece
1a yoke portion
1b tooth portion
1c shoe portion
2, 202, 302, 402 end surface insulator
2a, 202a outer flange
2b inner flange
2bs slit
2s, 302s slope portion
2t, 402t tooth end surface covering portion
2thb, 202ahb axially lower surface
2th, 202ah, 302sh overhang portion
402r projection
402tin, 402tout slope plane portion
402tu top portion
2tk, 202ak, 302sk, 402tk cutout
3 slot insulator
31 axial end
4, 204, 304, 404 coil
4a, 204a, 304a, 404a winding conductor
5 slot
5s surface
d1, d2 distance
10 divided stacked core
10a divided stacked yoke portion 10a1, 10b1, 10c1 axial end surface
10ain, 10bin edge
10as inner side surface
10b stacked tooth portion
10bs circumferential-direction side surface
10c stacked shoe portion
10cs outer side surface
50 divided stator
R1, R2, R3 space

The invention claimed is:

1. A stator for a rotary electric machine, comprising:
a core formed by annularly combining a plurality of cores each of which is formed by stacking a plurality of core pieces in an axial direction and has a yoke portion, a tooth portion protruding inward from an inner circumferential surface of the yoke portion, and shoe portions protruding toward both sides in a circumferential direction from an inner end of the tooth portion; and
a coil wound around the core with insulating members therebetween, wherein
the insulating members include the following two types:
end surface insulators mounted to both end surfaces in the axial direction of the core, each end surface insulator including an outer flange standing upward in the axial direction and covering a part radially outward from an inner-circumferential-side edge of an axial end surface of the yoke portion so as to be in close contact therewith, an inner flange standing upward in the axial direction and covering axial end surfaces of the shoe portions and a part radially outward from an inner-circumferential-side edge of the tooth portion so as to be in close contact therewith, and a tooth end surface covering portion which covers an axial end surface of the tooth portion so as to be in contact with the axial end surface and which has an outer-circumferential-side end connected to the outer flange and an inner-circumferential-side end connected to the inner flange via a slope portion which expands radially inward in a taper shape, and
a slot insulator seamlessly covering an inner side surface of the yoke portion, a circumferential-direction side surface of the tooth portion, and an outer side surface of the shoe portion,
on tooth portion sides of both side surfaces in the circumferential direction of the tooth end surface covering portion, first cutouts recessed in the circumferential direction are provided so as to extend in a radial direction, and a part axially upward of the first cutouts protrudes in the circumferential direction to form a first overhang portion,
the slot insulator is accommodated between the first overhang portions of the two end surface insulators,
on a circumferential-direction side surface of the slope portion, a third cutout having a recessed surface is provided contiguously to the first cutout of the tooth end surface covering portion,
a part axially upward of the third cutout protrudes radially outward to form a third overhang portion, and
the slot insulator is accommodated between the third overhang portions of the two end surface insulators,
an axial end of a part, of the slot insulator, that is fitted along an outer side surface of the shoe portion is fixed by being inserted into a slit formed along the axial direction at a lower end of a circumferential-direction end of the inner flange, and
the slit is provided in the inner flange so as to be circumferentially continuous with the third cutout of the tooth end surface covering portion and the slit is not provided in the slope portion.

2. The stator for a rotary electric machine according to claim 1, wherein
on a radially inner side surface of the outer flange, a second cutout recessed radially outward is provided outward in the circumferential direction and contiguously to the first cutout of the tooth end surface covering portion, and a part axially upward of the second cutout protrudes radially inward to form a second overhang portion, and
the slot insulator is accommodated between the second overhang portions of the two end surface insulators.

3. The stator for a rotary electric machine according to claim 2, wherein
a distance by which at least one overhang portion of the first overhang portion, the second overhang portion, and the third overhang portion protrudes is equal to or greater than a thickness of the slot insulator.

4. The stator for a rotary electric machine according to claim 3, wherein
a gap is formed between an axial end of the slot insulator and an axially lower surface of at least one overhang portion of the first overhang portion, the second overhang portion, and the third overhang portion.

5. The stator for a rotary electric machine according to claim 4, wherein
at a part upward of the first cutouts on a surface of the tooth end surface covering portion of the end surface insulator, a projection for positioning a winding conductor of the coil by engaging therewith in a radial direction is provided in the same direction as a winding direction of the coil.

6. The stator for a rotary electric machine according to claim 3, wherein
at a part upward of the first cutouts on a surface of the tooth end surface covering portion of the end surface insulator, a projection for positioning a winding conductor of the coil by engaging therewith in a radial direction is provided in the same direction as a winding direction of the coil.

7. The stator for a rotary electric machine according to claim 2, wherein
a gap is formed between an axial end of the slot insulator and an axially lower surface of at least one overhang portion of the first overhang portion, the second overhang portion, and the third overhang portion.

8. The stator for a rotary electric machine according to claim 7, wherein
at a part upward of the first cutouts on a surface of the tooth end surface covering portion of the end surface insulator, a projection for positioning a winding conductor of the coil by engaging therewith in a radial direction is provided in the same direction as a winding direction of the coil.

9. The stator for a rotary electric machine according to claim 2, wherein
at a part upward of the first cutouts on a surface of the tooth end surface covering portion of the end surface insulator, a projection for positioning a winding conductor of the coil by engaging therewith in a radial direction is provided in the same direction as a winding direction of the coil.

10. The stator for a rotary electric machine according to claim 1, wherein
at a part upward of the first cutouts on a surface of the tooth end surface covering portion of the end surface insulator, a projection for positioning a winding conductor of the coil by engaging therewith in a radial direction is provided in the same direction as a winding direction of the coil.

11. The stator for a rotary electric machine according to claim 1, wherein winding conductors of the coil at the slope portion are wound so as to extend across in the axial direction between the third overhang portions of the two end surface insulators.

* * * * *